United States Patent
Ishizaka

(10) Patent No.: US 7,076,662 B2
(45) Date of Patent: *Jul. 11, 2006

(54) DATA ALTERATION CHECKING APPARATUS AND METHOD AND RECORDING MEDIUM

(75) Inventor: Toshihiro Ishizaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/158,837

(22) Filed: Jun. 22, 2005

(65) Prior Publication Data

US 2005/0246392 A1 Nov. 3, 2005

Related U.S. Application Data

(63) Continuation of application No. 09/944,749, filed on Aug. 31, 2001, now Pat. No. 6,934,847.

(30) Foreign Application Priority Data

Sep. 1, 2000 (JP) ............................. 2000-266100

(51) Int. Cl.
*H04L 9/00* (2006.01)
*G06F 11/30* (2006.01)
*H04N 7/167* (2006.01)

(52) U.S. Cl. ...................... 713/181; 713/167; 713/193; 380/28; 380/201; 380/228; 705/57

(58) Field of Classification Search .................. 713/181
See application file for complete search history.

(56) References Cited

U.S. PATENT DOCUMENTS

| | | | | |
|---|---|---|---|---|
| 4,888,798 A | * | 12/1989 | Earnest ........................ | 705/54 |
| 5,343,527 A | * | 8/1994 | Moore ......................... | 713/179 |
| 5,995,624 A | * | 11/1999 | Fielder et al. ............... | 713/169 |
| 6,011,847 A | * | 1/2000 | Follendore, III ............ | 713/160 |
| 6,934,847 B1 | * | 8/2005 | Ishizaka ...................... | 713/181 |

FOREIGN PATENT DOCUMENTS

| | | |
|---|---|---|
| EP | 0 281 225 | 9/1988 |
| EP | 0 667 577 | 8/1995 |
| GB | 2 331 381 | 5/1999 |
| WO | WO 99 38076 | 7/1999 |

* cited by examiner

OTHER PUBLICATIONS

Patent Abstracts of Japan vol. 2000, No. 13, Feb. 5, 2001 & JP 2000 286839 A (Ricoh Co Ltd), Oct. 13, 2000.

*Primary Examiner*—Kambiz Zand
(74) *Attorney, Agent, or Firm*—Frommer Lawrence & Haug LLP; William S. Frommer; Thomas F. Presson

(57) ABSTRACT

MAC values formed with respect to each file belonging to a directory 122A and ICVs (D-ICVc) formed on the basis of the MAC values of all files belonging to the directory 122A are stored into a sequence page 121A. Sequence pages 121A, 121B, . . . formed respectively with respect to all of directories 122A, 122B, . . . on a disk and the ICVs formed on the basis of the D-ICVs stored in all of the sequence pages 121A, 121B, . . . are stored into a sequence block 114. Since the MAC values are closed and managed every directory by the sequence pages 121A, 121B, . . . , a data alteration check can be executed every directory. An alteration check of data recorded on a recording medium can be efficiently performed.

10 Claims, 18 Drawing Sheets

Fig. 5

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x00000000 | SPE Num | Block Size(Byte Count) | | | Revision | | | | Reserved | | | | | | | |
| 0x00000020 | Reserved | | | | | | | | | | | | | | | |
| | SEQUENCE PAGE ENTRY [0] | | | | | | | | | | | | | | | |
| | SEQUENCE PAGE ENTRY [1] | | | | | | | | | | | | | | | |
| | ... | | | | | | | | | | | | | | | |
| 0x000XXXXX | SEQUENCE PAGE ENTRY [m-1] | | | | | | | | | | | | | | | |
| 0x0001FFF0 | STUFFING BYTES | | | | | | | | | | | | | | | |

SPE Num : Sequence Page Entry Number
THE TOTAL NUMBER OF ENTRIES OF SEQUENCE PAGE Block Size : Sequence Block Size
SIZE OF SEQUENCE BLOCK, COUNT THE NUMBER OF BYTES FROM
HEAD BYTE TO LAST BYTE OF LAST ENTRY Revision : Revision Number
THE NUMBER OF TIMES OF REVISION OF SEQUENCE BLOCK, VALID/INVALID STATE
INCREASE BY "1" FROM INITIAL STATE "0"
0xFFFFFFFF = Invalid Number
INDICATES THAT THIS SEQUENCE BLOCK IS INVALID OR IS BEING REVISED

Fig. 6

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x00000000 | Page ID | | Entry Num | | Page Size(BYTE COUNT) | | | | Reserved | | | | | | | |
| 0x00000010 | D-ICV | | | | | | | | C_MAC [0] | | | | | | | |
| | ... | | | | | | | | | | | | | | | |
| | C_MAC [n-2] | | | | | | | | C_MAC [n-1] | | | | | | | |
| (0x0001D4C0) | | | | | | | | | | | | | | | | |

Page ID : Sequence Page ID
ID FOR ASSOCIATING SEQUENCE PAGE WITH FOLDER

Entry Num : MAC Entry Number
THE TOTAL NUMBER OF ENTRIES

Page Size : Sequence Page Size
SIZE OF SEQUENCE PAGE, COUNT THE NUMBER OF BYTES
FROM HEAD BYTE TO LAST BYTE OF LAST ENTRY C_MAC[n] : Contents MAC Value
MAC VALUE CALCULATES EVERY FILE (CONTENTS)

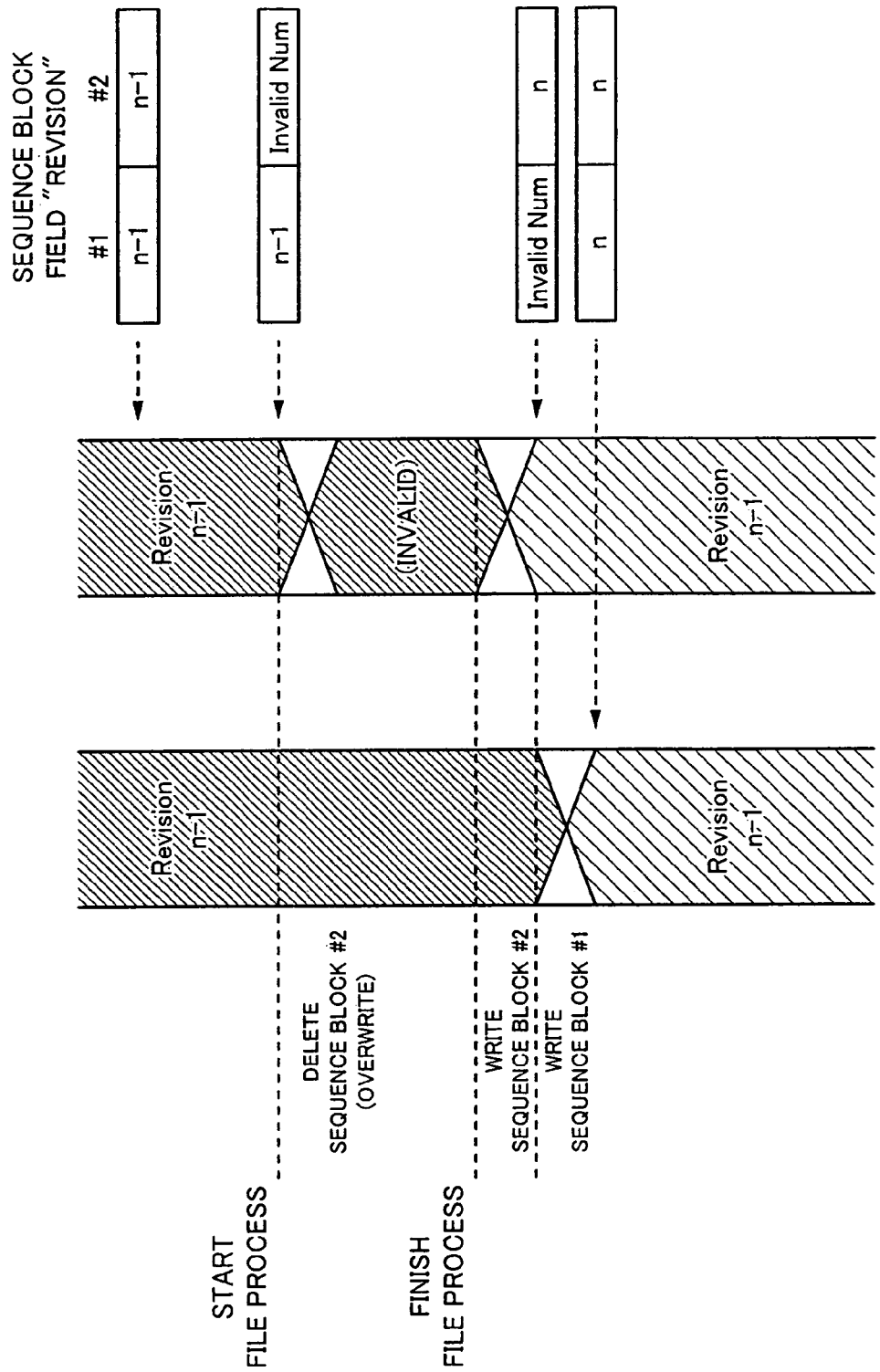

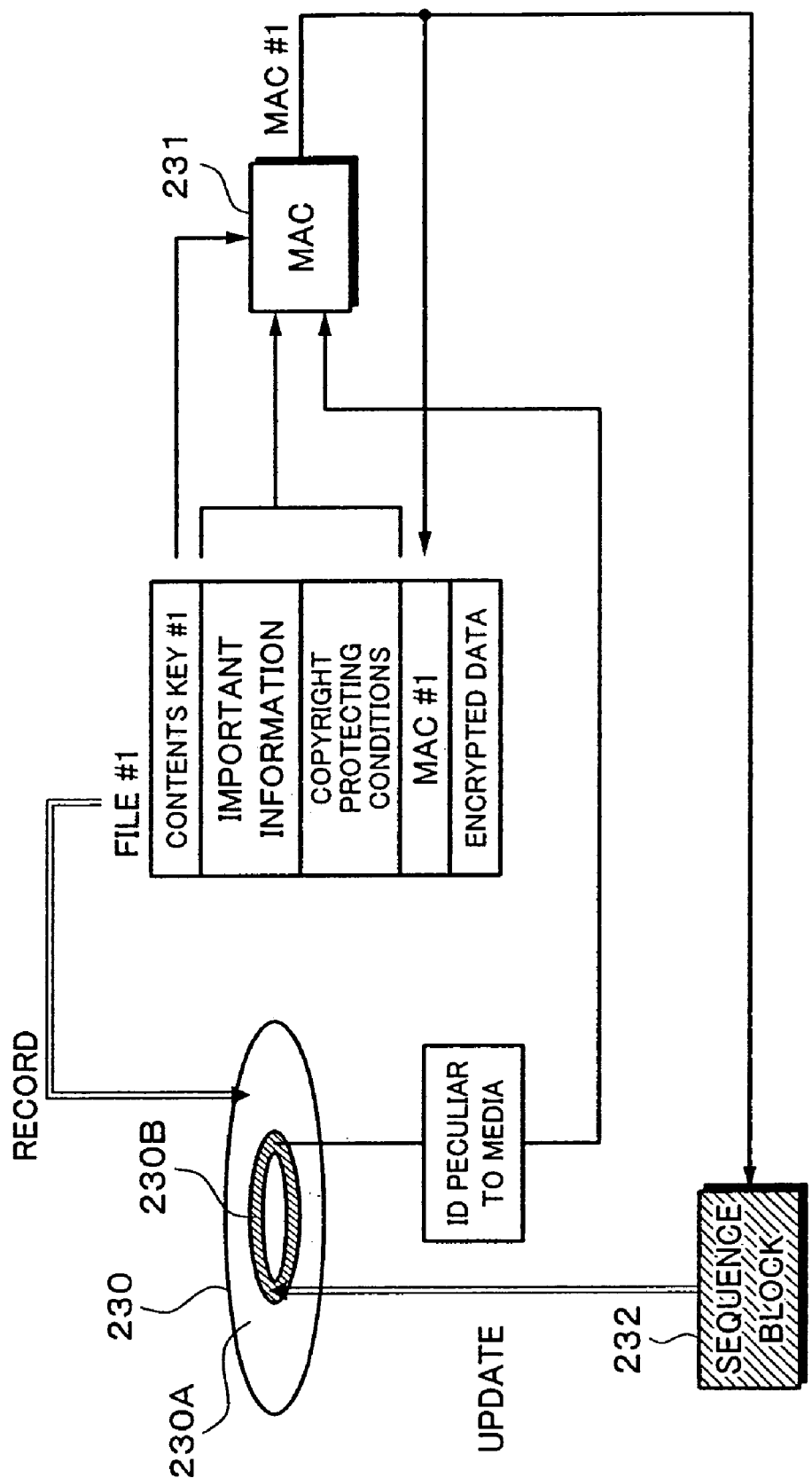

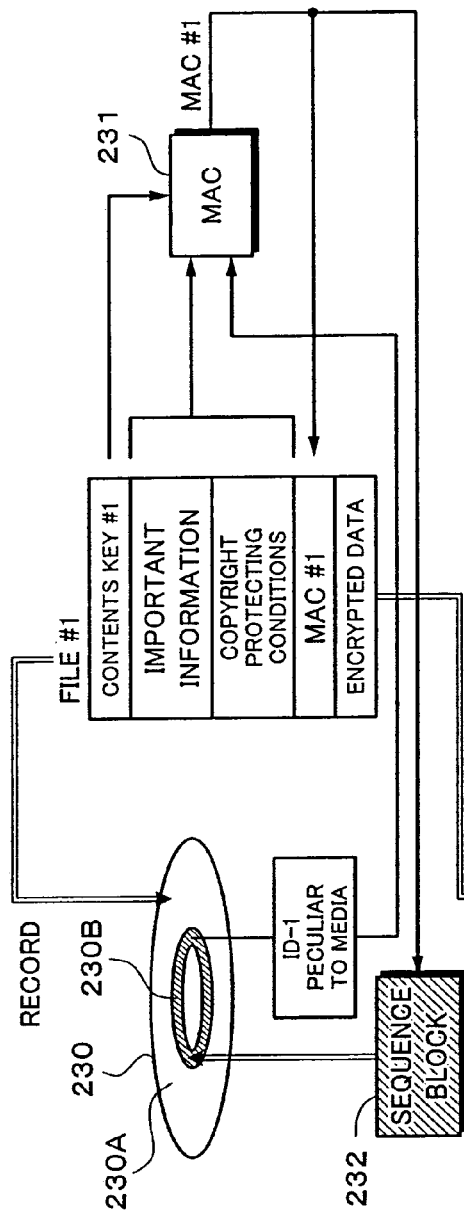
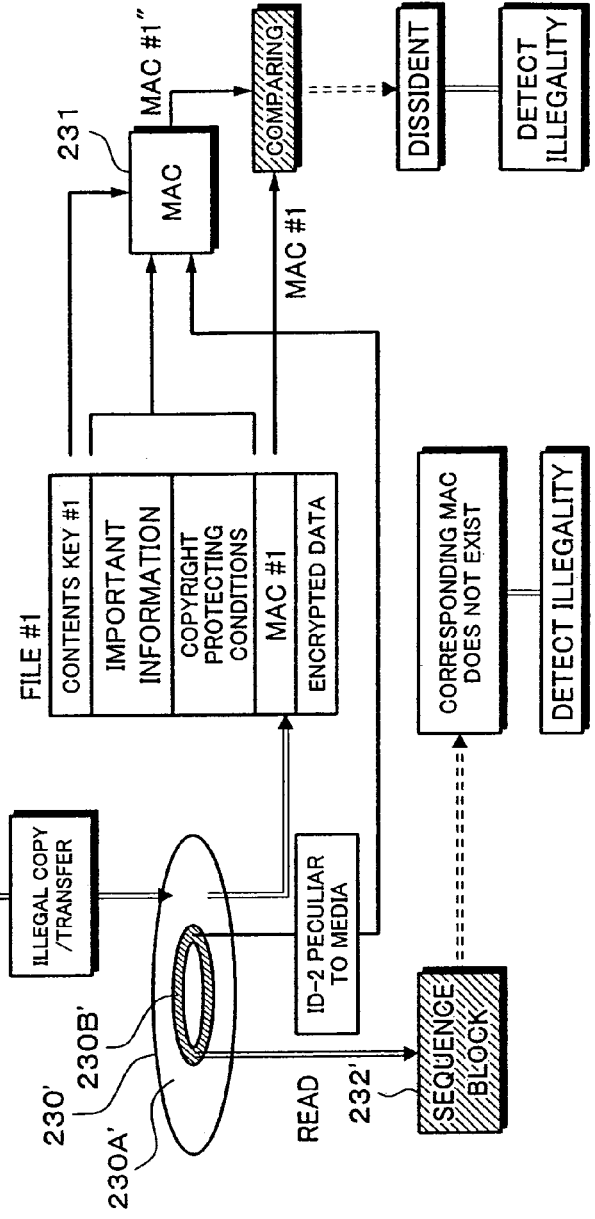
Fig. 10A
Fig. 10B

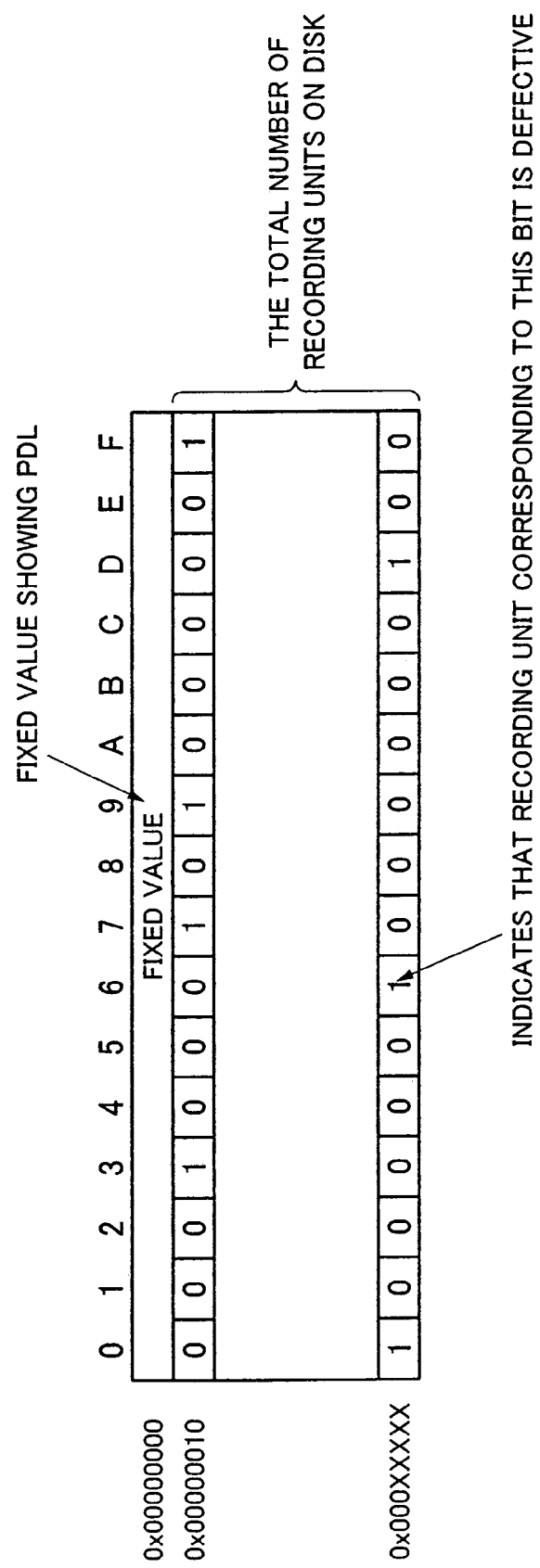

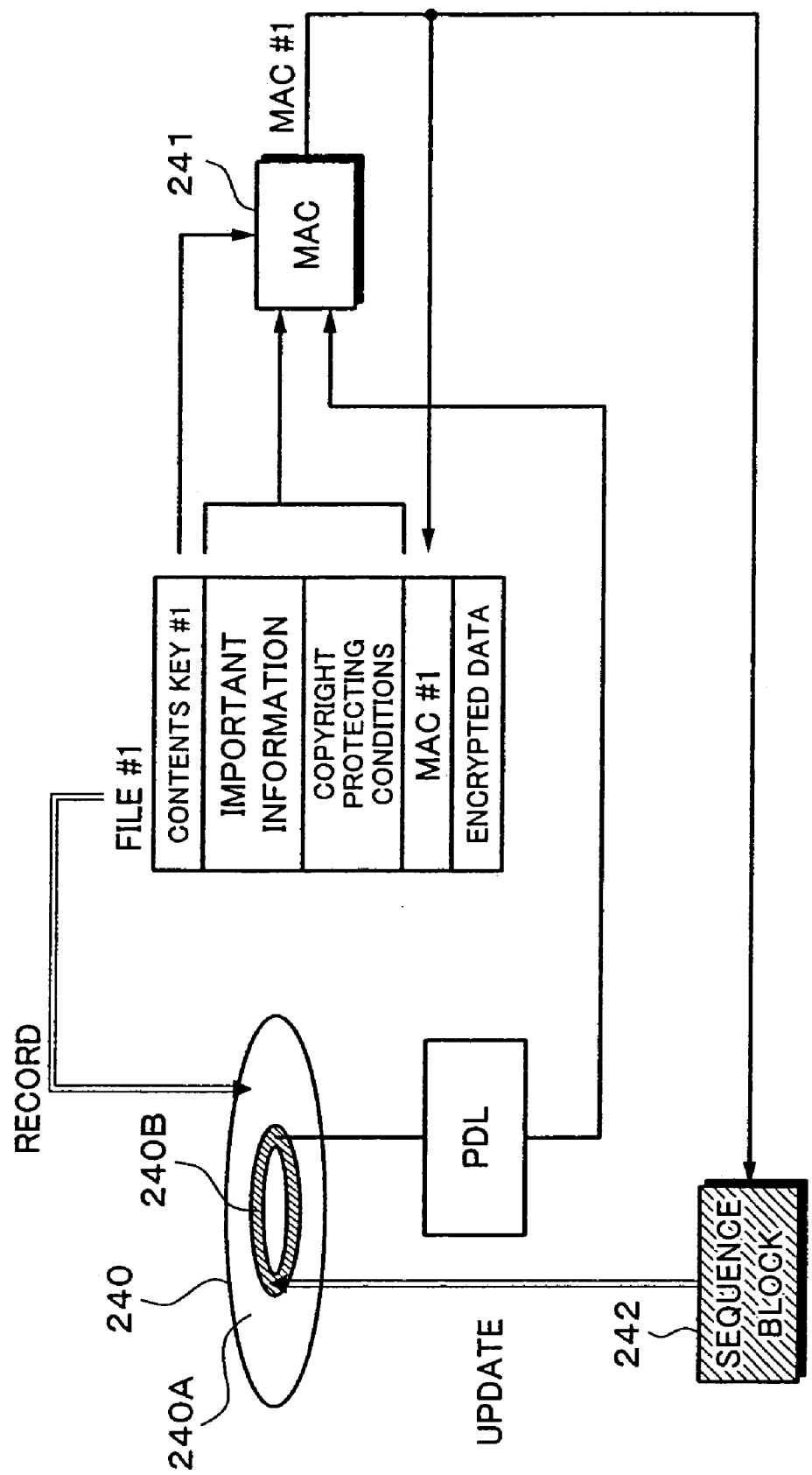

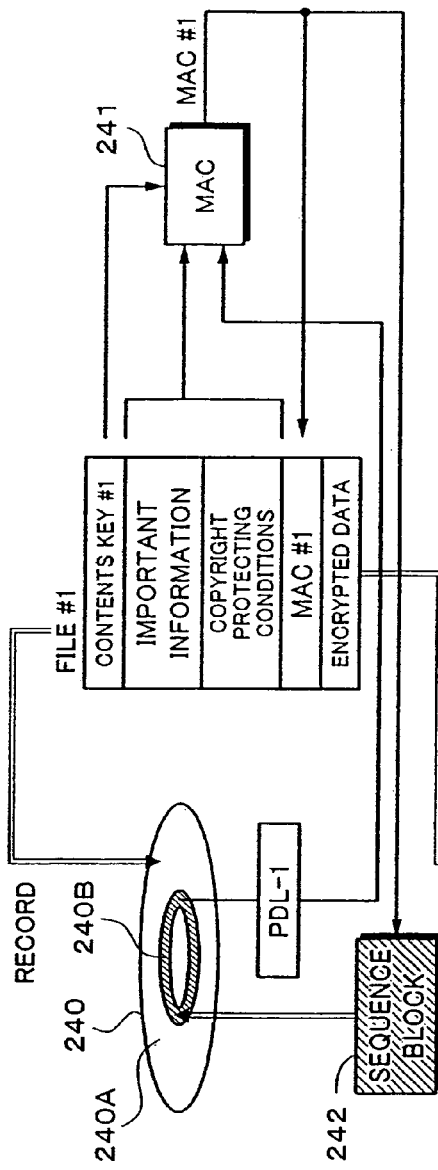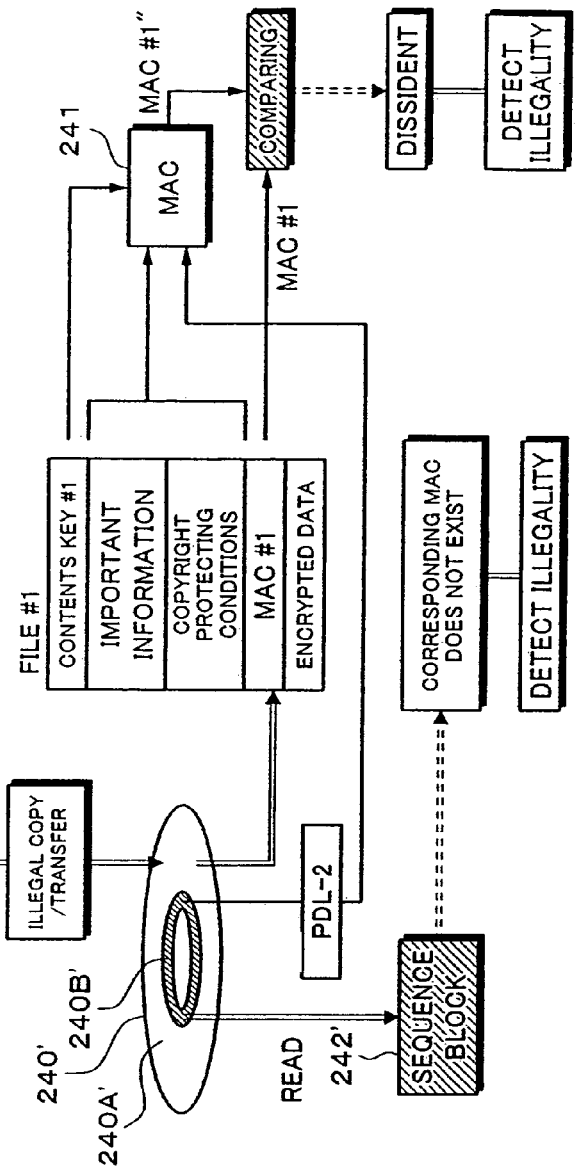
Fig. 13A
Fig. 13B

Fig. 15

| LSN | Description | Structure | LBN |
|---|---|---|---|
| 0 to 15 | Reserved (all 00h bytes) | | |
| 16 | Beginning Extended Area Descriptor | Volume Recognition Sequence (VRS) | |
| 17 | NSR Descriptor | | |
| 18 | Terminating Extended Area Descriptor | | |
| 19 to 31 | Reserved (all 00h bytes) | | |
| 32 | Primary Volume Descriptor | Main Volume Description Sequence (MVDS) | Not Assigned |
| 33 | Implementation Use Volume Descriptor | | |
| 34 | Partition Descriptor | | |
| 35 | Logical Volume Descriptor | | |
| 36 | Unallocated Space Descriptor | | |
| 37 | Terminating Descriptor | | |
| 38 to 47 | Trailing Logical Sectors (all 00h bytes) | | |
| 48 | Logical Volume Integrity Descriptor | Logical Volume Integrity Sequence (LVIS) | |
| 49 | Terminating Descriptor | | |
| 50 to 63 | Trailing Logical Sectors (all 00h bytes) | | |
| 64 to 255 | Reserved (all 00h bytes) | | |
| 256 | Anchor Volume Descriptor Pointer | First Anchor Point | |
| 257 to 271 | all 00h bytes Data | | |
| 272 to Last LSN-272 | Descriptor for File Structure and Files | Partition (LVS) | 0 to Last LBN |
| Last LSN-271 to Last LSN-257 | all 00h bytes Data | | |
| Last LSN-256 | Anchor Volume Descriptor Pointer | Second Anchor Point | |
| Last LSN-255 to Last LSN-224 | Reserved (all 00h bytes) | | |
| Last LSN-223 | Primary Volume Descriptor | Reserve Volume Descriptor Sequence (RVDS) | Not Assigned |
| Last LSN-222 | Implementation Use Volume Descriptor | | |
| Last LSN-221 | Partition Descriptor | | |
| Last LSN-220 | Logical Volume Descriptor | | |
| Last LSN-219 | Unallocated Space Descriptor | | |
| Last LSN-218 | Terminating Descriptor | | |
| Last LSN-217 to Last LSN-208 | Trailing Logical Sectors (all 00h bytes) | | |
| Last LSN-207 to Last LSN-1 | Reserved (all 00h bytes) | | |
| Last LSN | Anchor Volume Descriptor Pointer | Third Anchor Point | |

DATA ALTERATION CHECKING APPARATUS AND METHOD AND RECORDING MEDIUM

This is a continuation of application Ser. No. 09/944,749, filed Aug. 31, 2001, now U.S. Pat. No. 6,934,847, the entirety of which is incorporated herein by reference.

BACKGROUND OF THE INVENTION

1. Field of the Invention

The invention relates to data alteration checking apparatus and method for checking the presence or absence of alteration with respect to a contents file whose copyright is protected and which has been recorded on a recording medium and relates to a recording medium which is used for such an apparatus.

2. Description of the Related Arts

In recent years, the development of high density optical disks represented by a DVD (Digital Versatile Disk) has been progressed and the standardization of such disks has been progressed in association with it. AUDF (Universal Disk Format) has been determined by such standardization. A logic format according to the UDF is used in a DVD-RAM (DVD—Random Access Memory) in which a DVD is modified as a rewritable disk. The UDF can be also applied to a CD-R in which a CD-ROM (Compact Disc—Read Only Memory) is modified as a writable disk and a CD-RW in which a CD-ROM is modified as a rewritable disk.

In the UDF, a layer-like file system is used, a sub-directory is referred to from information stored in a root directory, and further another sub-directory or a substantial file is referred to from the information stored in the sub-directory.

The above construction will be described more specifically. A recording area on the disk is accessed by using a sector as a minimum unit and, for example, in case of the DVD-RAM, the recording area is accessed from the inside to the outside of the disk. An area in which volume information is written (such an area is referred to as a system area here) is arranged subsequent to a lead-in area from the innermost rim side. A position where a file entry (hereinafter, abbreviated to "FE") of the root directory is written is shown in the system area. The FE comprises a root directory, a sub-directory, and an allocation descriptor (hereinafter, abbreviated to "AD") as information of an address and a length of the file.

In the FE of the root directory, a logic address and a length of the root directory as a substance are shown by the AD. The root directory includes one or a plurality of file identifier descriptors (hereinafter, abbreviated to "FIDs"). The FE of the sub-directory or the FE of the file under the root directory is referred to by the FID. By those FEs, the substance of the corresponding sub-directory or file is referred to. The substance of the sub-directory includes one or a plurality of FIDs. That is, in the UDF, the directories other than the root directory are accessed in the order of the FIDs, FEs, and substances by using the FID and FE as pointers.

There is an alteration check as one of technical elements regarding the protection of the copyright of the information data recorded on the recording medium. It is a technique for preventing illegal alteration with respect to the recorded information data and detecting the alteration in the case where the information data has illegally been altered. Further, according to the alteration check, by binding the information data as data closed in the recording medium on which the information data has been recorded, an illegal copy of the information data can be prevented. In the copyright protection, therefore, such a technique can be regarded as a-very important technical element.

A conventional data alteration checking method will now be schematically explained. An alteration check value which is unconditionally formed and in which it is difficult to identify source information by a reverse arithmetic operation is obtained every file (contents) as a unit of the information data from attribute information of the file such as important administration information, copyright information, state information, and the like. The obtained alteration check value is written into an alteration check administration value space as an area or a file which is provided on the recording medium and which cannot be easily accessed by the user. When the recording medium is reproduced, an alteration check value is obtained on the basis of reproduction data and the obtained alteration check value is compared with the alteration check value written in the alteration check administration value space, thereby discriminating whether an illegal movement or copy of the file has been performed or not.

Similarly, a method of discriminating whether an illegal movement or copy of the file has been performed or not by obtaining alteration check values with respect to all of the files existing on the same recording medium is also embodied.

As a method of obtaining the alteration check values, for example, an arithmetic operating method called MAC (Message Authentication Code) specified in ISO/IEC9797 is known. There is a case where the alteration check value itself of each file is called MAC. At this time, particularly, there is a case where the alteration check with respect to all of the files existing on the same recording medium is called ICV (Integrity Check Value), thereby distinguishing both of them. The alteration check value of each file is called MAC and the alteration check values with respect to all of the files on the same recording medium are called ICVs hereinbelow.

According to the conventional alteration checking method, the MAC is formed every file on the recording medium as mentioned above. In recent years, the realization of a large memory capacity of the recording medium has remarkably been progressed. As the memory capacity of the recording medium increases, the number of files existing on the recording medium also becomes very large and it is presumed that an amount of MAC also becomes very large in association with it. As a procedure of the above alteration checking method, it is necessary to arithmetically operate the present MACs and ICVs at timing for performing the check on the basis of the files or the like existing on the recording medium. At this time, particularly, in case of the disk-shaped recording medium, a driving system exists in terms of its structure and there is a problem such that it takes a long time for the access which is performed to obtain information for obtaining the MACs and ICVS. There is also a problem such that it causes a stress to the user.

Further, in the case where various kinds of contents exist on the same recording medium, contents files other than the targets of the alteration check are also included in the alteration checking procedure every time in dependence on application software or set equipment for reproducing the recording medium. In such a case, it takes surplus time which is spent for the alteration check and there is a problem such that a time efficiency is low.

Further, a case where the alteration checking procedure has to be performed with respect to a specific file at certain timing is also considered. In such a case, in the application software or set equipment, the corresponding MAC is searched from an MAC list of the relevant file held at the time of the first alteration check regarding the recording medium and the alteration check is performed by using the searched MAC. In this case, if the memory capacity of the recording medium becomes large and the number of files existing on the recording medium is very large as mentioned above, a scale of the MAC list is also very large and it is necessary to spend a long time to specify the corresponding MAC from the list. There is, consequently, a problem such that the time efficiency is low in a manner similar to that mentioned above.

As an example of measures for solving the above problem, there is a method whereby an area to store the MAC is set to a fixed length and a storing location of the MAC is directly specified in accordance with the file number or the like. In case of the recording medium of the large capacity, however, there is a problem such that it is necessary to assure a fairly large area for this purpose due to a contents storing ability.

According to such a method, since the area to store the MAC is set to the fixed length, there is a problem such that it is necessary to limit the number of files or the like and it is not practical.

Hitherto, as a method of binding the information data files existing on the recording medium onto the recording medium, a method whereby a peculiar ID is embedded into the recording medium and an information data file which is recorded onto the recording medium is encrypted by using a contents key to which the ID has been reflected is embodied. A method whereby a certain kind of key is embedded into the recording medium in a state where it is protected by, for example, an encryption or the like and this key is used for encrypting the information data is also used likewise. According to both of the above methods, for example, even in the case where the file recorded on the recording medium is illegally copied onto another recording medium, since an ID different from that of the recording medium on the copying source side has been embedded into such another recording medium, the encryption performed to the information data cannot be decrypted upon reproduction of such another recording medium, so that a state which is substantially closed in the recording medium can be realized.

According to such a method, however, when a copy or a movement of the file is executed by a legal procedure, it is necessary to decode the information data to be copied or moved and encrypt it again by using a peculiar ID or key of the recording medium on the copy or movement destination side, so that there is a problem such that it is very troublesome to the user.

The foregoing alteration check is also used for realizing a mechanism similar to that mentioned above. If the ICV can be certainly held on the recording medium, even when the file is illegally moved or copied onto such a recording medium, a mismatch can be detected. At a point when the mismatch is detected, by obtaining each MAC with respect to all of the files existing on the recording medium at present and comparing the obtained MACs with the MACs which have already been recorded, the files which were illegally moved or copied can be specified.

According to the calculation of the ICVs and the checking procedure, however, since a procedure to calculate the MACs with respect to all of the files existing on the recording medium is necessary, it takes a long time for the processes. On the other hand, if only the MACs are used, the files are not always bound on the recording medium. Therefore, in case of the method using the MAC, it is certainly necessary to use at least the foregoing method using the ICVs or the like together. At this time, particularly, in case of the disk-shaped recording medium, the driving system exists in terms of its structure and there is a problem such that it takes a long time for the access which is executed to obtain information for obtaining the MACs and ICVs. There is also a problem such that it causes a stress to the user.

OBJECTS AND SUMMARY OF THE INVENTION

It is, therefore, an object of the invention to provide data alteration checking apparatus and method which can efficiently perform an alteration check of data and to provide a recording medium which is used for such an apparatus.

According to the first aspect of the invention, the above object is accomplished by a data alteration checking apparatus for discriminating whether data recorded on a recording medium has been altered or not, comprising: reading means for respectively reading out a data block and a file from the recording medium on which with respect to one or each of a plurality of files belonging to a directory serving as an upper concept in which one or a plurality of files are bound, the data block including one or a plurality of list-type data structures each including a plurality of first arithmetic operation values which were arithmetically operated every file on the basis of attribute information of the file by a predetermined arithmetic operating method which is unconditional and does not have a reversible property based on a reverse arithmetic operation has been recorded into an area that is not accessed by a file system on the recording medium and each of the first arithmetic operation values has been written into the corresponding file; and comparing means for comparing a second arithmetic operation value which was arithmetically operated by the predetermined arithmetic operating method on the basis of the attribute information of the file read out by the reading means with the first arithmetic operation value which corresponds to the file and is included in the list-type data structure corresponding to the directory to which the file read out by the reading means belongs in the data block read out by the reading means, wherein on the basis of a result of the comparison by the comparing means, when the first and second arithmetic operation values do not coincide, it is determined that the file has been altered.

According to the second aspect of the invention, there is provided a data alteration checking method of discriminating whether data recorded on a recording medium has been altered or not, comprising: a reading step of respectively reading out a data block and a file from the recording medium on which with respect to one or each of a plurality of files belonging to a directory serving as an upper concept in which one or a plurality of files are bound, the data block including one or a plurality of list-type data structures each including a plurality of first arithmetic operation values which were arithmetically operated every file on the basis of attribute information of the file by a predetermined arithmetic operating method which is unconditional and does not have a reversible property based on a reverse arithmetic operation has been recorded into an area that is not accessed by a file system on the recording medium and each of the first arithmetic operation values has been written into the corresponding file; and a comparing step of comparing a second arithmetic operation value which was arithmetically operated by the predetermined arithmetic operating method on the basis of the attribute information of the file read out by the reading step with the first arithmetic operation value which corresponds to the file and is included in the list-type data structure corresponding to the directory to which the file read out by the reading step belongs in the data block read out by the reading step, wherein on the basis of a result of the comparison by the comparing step, when the first and second arithmetic operation values do not coincide, it is determined that the file has been altered.

According to the third aspect of the invention, there is provided a recording medium on which data is recorded by a file structure having a directory serving as an upper concept in which one or a plurality of files are bound, wherein with respect to the one or each of the plurality of files belonging to the directory serving as an upper concept in which the one or the plurality of files are bound, a data block including one or a plurality of list-type data structures each including a plurality of first arithmetic operation values which were arithmetically operated every file on the basis of attribute information of the file by a predetermined arithmetic operating method which is unconditional and does not have a reversible property based on a reverse arithmetic operation is recorded into an area that is not accessed by a file system and each of the first arithmetic operation values is written into the corresponding file.

As mentioned above, according to the invention, the data block and the file are respectively read out from the recording medium on which with respect to one or each of a plurality of files belonging to the directory serving as an upper concept in which the one or the plurality of files are bound, the data block including one or a plurality of list-type data structures each including a plurality of first arithmetic operation values which were arithmetically operated every file on the basis of the attribute information of the file by the predetermined arithmetic operating method which is unconditional and does not have the reversible property based on the reverse arithmetic operation has been recorded into the area that is not accessed by the file system on the recording medium and each of the first arithmetic operation values has been written into the corresponding file, the second arithmetic operation value which was arithmetically operated by the predetermined arithmetic operating method on the basis of the attribute information of the read-out file is compared with the first arithmetic operation value which corresponds to the file and is included in the list-type data structure corresponding to the directory to which the file read out by the reading step belongs in the read-out data block, and on the basis of the comparison result, when the first and second arithmetic operation values do not coincide, it is determined that the file has been altered. Therefore, the data alteration check can be efficiently performed with respect to the time.

The above and other objects and features of the present invention will become apparent from the following detailed description and the appended claims with reference to the accompanying drawings.

BRIEF DESCRIPTION OF THE DRAWINGS

FIG. 5 is a schematic diagram showing a logic format of an example of a sequence block;

FIG. 6 is a schematic diagram showing a logic format of an example of a sequence page;

FIGS. 7A to 7C are schematic diagrams showing an updating procedure of sequence blocks according to an embodiment;

FIG. 9 is a functional block diagram of an example showing a fundamental process for performing a data alteration check according to the second embodiment;

FIGS. 10A and 10B are functional block diagrams of an example showing a data alteration checking method according to the second embodiment;

FIG. 11 is a schematic diagram showing a data structure of an example of a PDL;

FIG. 12 is a functional block diagram of an example showing a fundamental process for performing a data alteration check according to a modification of the second embodiment;

FIGS. 13A and 13B are functional block diagrams of an example showing a data alteration checking method according to a modification of the second embodiment;

FIG. 15 is a schematic diagram showing contents of an example of a volume information area;

DETAILED DESCRIPTION OF THE PREFERRED EMBODIMENTS

An embodiment of the invention will now be described hereinbelow with reference to the drawings. First, to make it easy to understand, a fundamental data alteration checking method in case of using a disk as a recording medium will be described with reference to FIGS. 1 and 2. The fundamental alteration checking method which is explained here is obtained by introducing the arithmetic operating method according to the MAC (Message Authentication Code) of ISO/IEC9797. An alteration check value itself which is obtained every file is called an MAC value and the alteration check values which are obtained with respect to all of the files existing on the same recording medium are called ICVs (Integrity Check Values) hereinbelow.

Figure 1:
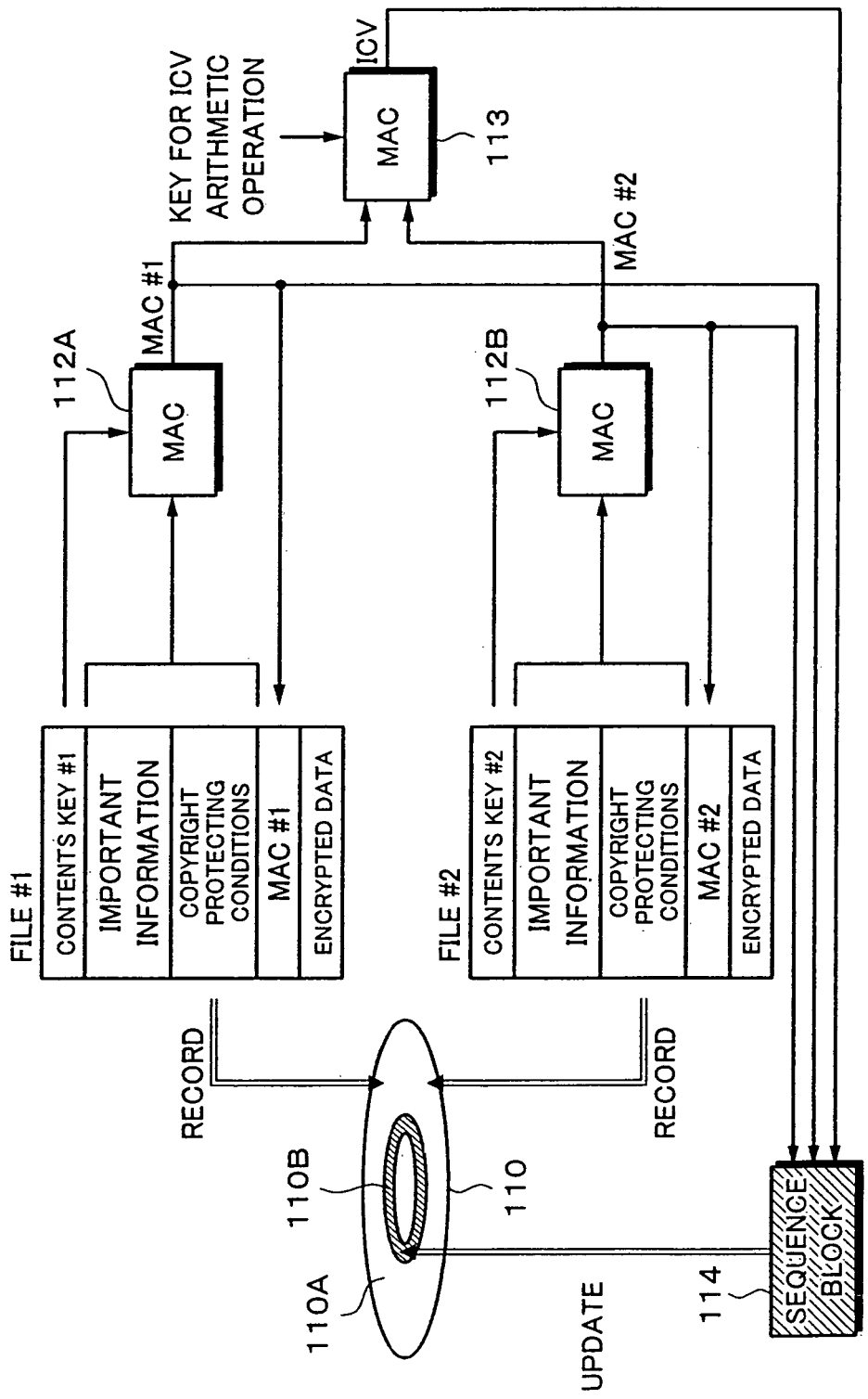
FIG. 1 is a functional block diagram of an example schematically showing an alteration checking method in the case where files have been newly added onto a disk recording medium.

FIG. 1 is a functional block diagram of an example schematically showing an alteration checking method in the case where files #1 and #2 have newly been added onto a disk recording medium. An MAC value is obtained on the basis of the arithmetic operating method of the MAC with respect to each of the files recorded in a user data area 110A on a disk recording medium (hereinafter, abbreviated to a disk) 110. For example, like a file #1 shown in FIG. 1, a predetermined arithmetic operation is executed by an MAC arithmetic operating unit 112A by using attribute information of the file such as copyright information, important information of the file, and the like and information serving as a key that is peculiar to this file, for example, a contents key used when an actual data portion of the file is encrypted, so that an MAC value #1 is obtained.

An MAC value is also similarly obtained with respect to other files. For example, in the file #2, an MAC value #2 is obtained by an MAC arithmetic operating unit 112B from a contents key, attribute information of the file such as important information, copyright protecting conditions of the file, and the like in a manner similar to that mentioned above.

The MAC value can be also obtained by further using the number of reproducing times of the file, the number of copying times of the file, or the like without limiting to the copyright information, the important information of the file, the contents key, and the like as mentioned above. For example, by obtaining the MAC value by further using the number of copying times of the file, the copy generation of the file can be restricted.

The MAC value is a value which is formed by using a hash function as a unidirectional function on the basis of the given value and the original value cannot be obtained by performing a reverse arithmetic operation from the MAC value.

The MAC values #1 and #2 formed with respect to the files #1 and #2 as mentioned above are stored into the corresponding files as header information of the corresponding files, respectively. At the same time, the MAC values #1 and #2 are collectively stored into an area which cannot be easily accessed by the user in the recording area on the disk 110, for example, into a lead-in area 110B prepared on the disk 110. In the system in which the disk 110 is handled, the lead-in area 110B is an area which is not accessed by the file system, that is, an area which does not exist on the logic address in the file system.

Further, the MAC values #1 and #2 formed every file are inputted to an MAC arithmetic operating unit 113. A key for an ICV arithmetic operation is further inputted to the MAC arithmetic operating unit 113. ICVs are formed on the basis of the key for the ICV arithmetic operation and the inputted MAC values #1 and #2. The ICVs are values to which information of all of the files as targets on the disk 110 was reflected. The formed ICVs are recorded into the lead-in area 110B on the disk 110 in a manner similar to the foregoing MAC values #1 and #2.

In the case where the files #1 and #2 were newly added onto the disk 110 as mentioned above, the MAC values #1 and #2 as alteration check values of each file and the ICVs as alteration check values to which the information of all of the files as targets on the disk 110 was reflected are recorded in the lead-in a real 110B. An area like a lead-in area 110B in which information regarding the alteration check is stored and a data structure in such an area are called a sequence block here. In FIG. 1, the MAC values #1 and #2 of each file and the ICVs are stored into a sequence block 114. As mentioned above, the sequence block 114 is recorded into an area which cannot be easily accessed by the user in the recording area on the disk 110, for example, into the lead-in area 110B.

Figure 2:
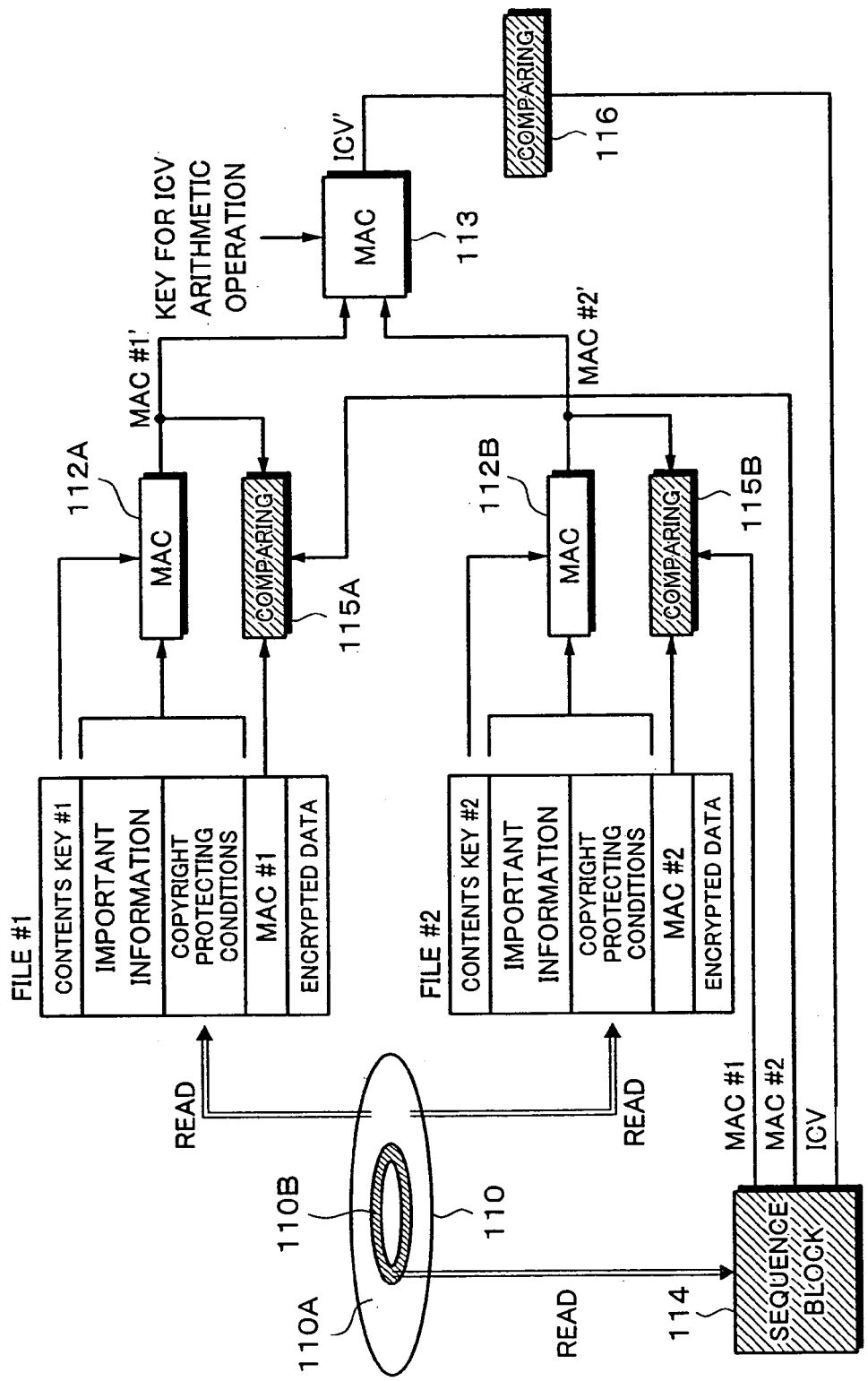
FIG. 2 is a functional block diagram showing a procedure in an example in case of reproducing or moving a certain specific file on the disk or at timing when an alteration check is requested in a system.

FIG. 2 is a functional block diagram showing a procedure in an example in case of reproducing or moving, for example, a certain specific file on the disk 110 or at timing when the alteration check is requested in the system. The alteration check regarding the certain specific file is executed by using the MAC values. For example, in the case where the file #1 is reproduced or moved, the MAC value is first formed with respect to this file by the method which has already been described with reference to FIG. 1. The MAC value which is formed with respect to the file #1 is assumed to be an MAC value #1'.

On the other hand, the MAC value #1 which was formed and stored into a header portion of the file #1 when the file #1 has been recorded onto the disk 110 and the MAC value #1 which was stored into the sequence block 114 in the lead-in area 110B together with the storage of the MAC value #1 into the header portion are extracted. Those extracted MAC values #1 are compared with the MAC value #1' by a comparing unit 115A. As a result of this comparison, if the MAC value #1' does not coincide with the MAC value #1 extracted from the header portion and the MAC value #1 extracted from the sequence block 114, it is determined that there is a fear that an alteration has illegally been performed to the file #1. An error process is executed in the system.

The alteration check with respect to all of the files on the disk 110 is executed by using the ICVs stored in the sequence block 114. For example, in the case where a file (assumed to be the file#1) on the disk 110 is reproduced or moved, MAC values are first formed with regard to all of the files on the disk 110 in a manner similar to that mentioned above. With respect to the formed MAC values about all of the files, an ICV' is formed by the MAC arithmetic operating unit 113 by using the key for the ICV arithmetic operation.

On the other hand, the ICVs stored in the sequence block 114 in the lead-in area 110B on the disk 110 are extracted. The ICVs extracted from the sequence block 114 are compared with the ICV' formed from the MAC values of all of the files on the disk 110 by a comparing unit 116. As a result of the comparison, if they do not coincide, it is determined that the illegal movement, copy, erasure, or the like of the file has been performed on the disk 110. An error process is executed in the system.

Figure 3:
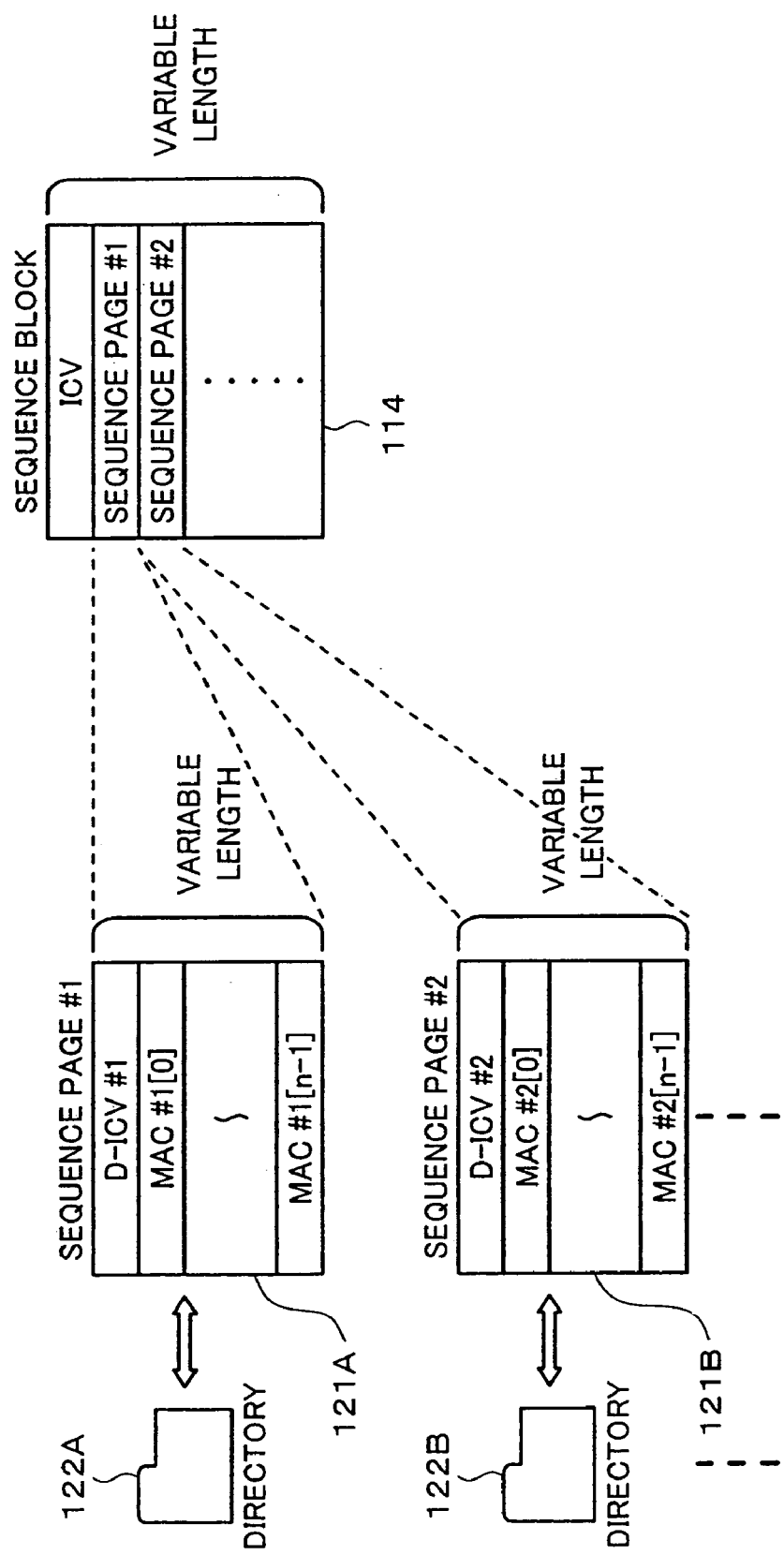
FIG. 3 is a diagram schematically showing a data structure of alteration check values according to the embodiment.

The alteration checking method according to the first embodiment of the invention will now be described in consideration of the fundamental alteration checking method mentioned above. FIG. 3 schematically shows a data structure of alteration check values according to the embodiment. The first embodiment is made by paying attention to the structure of the sequence block 114 in the fundamental constructions shown in FIGS. 1 and 2 mentioned above. As a recording medium which is applied, the disk 110 as a disk-shaped recording medium as mentioned above is presumed. In the first embodiment, the recording medium which can be applied is not limited to the disk-shaped recording medium.

The sequence block 114 comprises: one or a plurality of sequence pages 121A, 121B, . . . ; and alteration check values ICVs regarding all of the files on the disk 110. Each of the sequence pages 121A, 121B, . . . has a data structure in which the alteration check values of each file on the disk 110, for example, a plurality of MAC values are stored as a list structure. A process for making each file and the MAC values correspond to each other is performed, for example, by arranging entries of the MAC values in the sequence page in the order corresponding to the searching order of a tree structure of the files which is constructed by the file system.

As for the files on the disk 110, one or a plurality of files are bound as a directory serving as an upper concept. Each of the sequence pages #1, #2, . . . is made to correspond to the directory in which the files corresponding to the MAC values which are stored have been bound. For example, fields for storing IDs such that directories 122A, 122B, . . . and the sequence pages 121A, 121B, . . . correspond to each other are specified in the sequence pages 121A, 121B, . . . , respectively, thereby enabling the correspondence between the directories 122A, 122B, . . . , and the sequence pages 121A, 121B, . . . to be obtained.

For example, the sequence pages 121A, 121B, . . . are allowed to correspond to the directories 122A, 122B, . . . formed on the disk 110, respectively. The MAC value formed from each of the files included in the corresponding directory and ICVs formed by using the MAC values of all of the files included in this directory as inputs are stored into the sequence pages 121A, 121B, . . . .

For example, the sequence page 121A corresponding to the directory 122A comprises: MAC values #1[0], #1[1], . . . , and #1[n−1] formed from files #1[0], #1[1], . . . , and #1[n−1] (not shown) which are stored into the directory 122A; and ICVs formed from the MAC values of all of the files #1[0], #1[1], . . . , and #1[n−1].

The ICVs formed by inputting the MAC values of all of the files included in the directory are called D-ICVs hereinbelow. In FIG. 3, "#1" and "#2" are written to distinguish the corresponding directories, and contents in [ ] are written to distinguish the files which are stored in the relevant directory.

Further, the ICVs which are stored into the sequence block 114 are formed by inputting all of D-ICV#1, D-ICV#2, . . . which are stored into the sequence pages 121A, 121B, . . . . Therefore, the ICVs which are stored into the sequence block 114 eventually become the values to which the MAC values for the files of the whole disk 110 have been reflected.

As mentioned above, the number of MAC values which are stored into the sequence pages 121A, 121B, . . . changes in accordance with the number of files which are stored into the corresponding directories 122A, 122B, . . . . Similarly, the number of sequence pages 121A, 121B, . . . which are stored in the sequence block 114 changes in accordance with the number of directories 122A, 122B, . . . which are formed on the disk 110. Therefore, the sequence block 114 is constructed as an area of a variable length and each of the sequence pages 121A, 121B, . . . in the sequence block 114 is also constructed as an area of a variable length.

Figure 4:
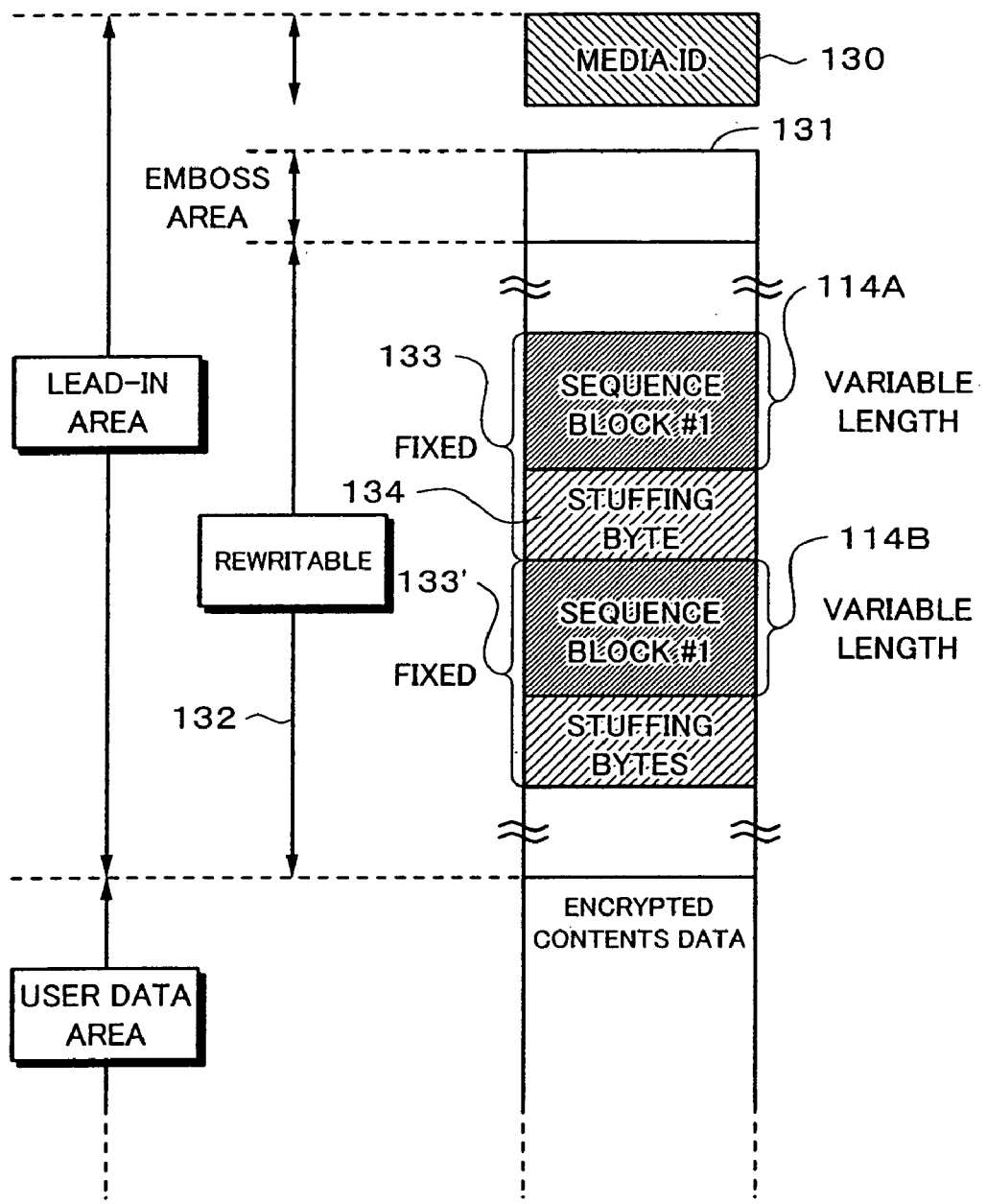
FIG. 4 is a schematic diagram partially showing a physical format of an example of the disk.

FIG. 4 partially shows a physical format of an example of the disk 110. In the case where the disk 110 is a disk on which data is recorded from the inner rim side to the outer rim side of the disk, the upper side of FIG. 4 corresponds to the inner rim side of the disk and the lower side corresponds to the outer rim side of the disk, respectively. The lead-in area 110B is arranged from the inner rim side of the disk. A user data area is started from the outside of the lead-in area 110B. The user data area is an area to which the logic address is allocated and which can be accessed by the file system which handles the disk 110. The lead-in area 110B, on the other hand, is an area which does not exist on the logic address and which is not accessed by the file system as mentioned above.

At the head of the lead-in area 110B, an area 130 in which a media ID is recorded is provided so as to have a size of, for example, 132 bytes. An emboss area 131 is arranged after the area of the media ID. An area in a range from a position next to the emboss area 131 to the end of the lead-in area 110B is set to a rewritable area 132. The sequence block 114 is written twice at a predetermined position in the rewritable area 132 and the resultant double blocks are assumed to be a sequence block 114A and a sequence block 114B, respectively.

The sequence block 114A is written into a fixed area 133 having a size of, for example, 128 kbytes and starting from the predetermined position of the rewritable area 132. The sequence block 114B comprising the same data as that of the sequence block 114A is written into a fixed area 133' having a size of, for example, 128 kbytes which is arranged subsequently to the fixed area 133.

For example, the sequence block 114A is written in the fixed area 133, for example, in the order from the head position. An area 134 remaining in the fixed area 133 is filled with stuffing bytes. The fixed area 133' is also constructed in a manner similar to the fixed area 133.

FIG. 5 shows a logic format of an example of the sequence blocks 114A and 114B. In the diagram, a numerical value starting from "0x" denotes that it is expressed by a hexadecimal notation. The sequence block 114A will now be described as an example. Bytes are shown in the lateral direction. The total number of entries of the sequence pages entered in the sequence block 114A is stored in a field "SPE Num" of first two bytes. A size of the sequence block 114A itself is stored in a field "Block Size" of next four bytes. The number of bytes in a range from the head byte of the sequence block 114A to the last byte of the last entry is stored.

A field "Revision" is arranged in 4 bytes subsequent to the field "Block Size". The number of rewriting times of the sequence block 114A and a value Revision showing in which state of "valid" or "invalid" the sequence block 114A is are stored in the field "Revision". An initial state of the value Revision is set to "0" and the value is increased one by one each time the sequence block 114A is rewritten. If the sequence block 114A is invalid or is being rewritten, the value Revision=Invalid Num and a message indicative of this fact is shown. The value Invalid Num is shown by, for example, a value "0xFFFFFFFF".

Six bytes subsequent to "Revision" and next 16 bytes are system-reserved. The ICV can be stored into those system reservation bytes. The sequence pages 121A, 121B, . . . are entered from the 133rd byte. When the information of the sequence pages corresponding to all of the directories existing on the disk 110 is entered, the fixed area 133 in which the sequence block 114A is stored is filled with, for example, the stuffing bytes of all "0" up to the last byte. Since the size information of the sequence block 114A itself is described in the field "Block Size", the stuffing bytes are not always necessary.

As mentioned above, in the embodiment, the sequence block is constructed by an assembly of the sequence pages as data structures corresponding to the directories existing on the disk 110 in a one-to-one relational manner.

FIG. 6 shows a logic format of an example of the sequence pages 121A, 121B, . . . . In the diagram, a numerical value starting from "0x" denotes that it is expressed by a hexadecimal notation. The sequence page 121A will now be described as an example. A Page ID for allowing the sequence page 121A to be concerned with the directory in the file system on the disk 110 is stored into a field "Page ID" of first 2 bytes. The total number of MAC values which entered the sequence page 121A is stored into a field "Entry Num" of next 2 bytes. A size of the sequence page 121A itself is stored into a field "Page Size" of next 4 bytes. The number of bytes in a range from the head byte of the sequence page 121A to the last byte of the last entry is stored. Next 8 bytes are system-reserved.

The D-ICV is stored into a field "D-ICV" of the 17th byte. The MAC values are stored from the subsequent 33rd byte. The MAC values are set to a fixed length of, for example, 64 bits, that is, 8 bytes. The MAC values are filled on an 8-byte unit basis from the 17th byte of the sequence page 121A.

As mentioned above, in the embodiment, a field "Page ID" in which the values such as to correspond to the directories on the disk 110 in a one-to-one corresponding manner are stored is specified in the sequence page. Therefore, in the alteration checking procedure, processes only with respect to the specific sequence page as a target in the sequence block 114A can be executed. That is, according to the first embodiment, the data alteration check can be performed only with respect to the specific directory on the disk 110.

According to the embodiment, the sequence blocks 114A and 114B function mutually as a backup. That is, when a reproduction, a change, a copy, or the like of the file on the disk is executed, the above process is started for one of the sequence blocks and it is updated. The updating of the other sequence block is inhibited during the process and it is updated when the process is finished. Thus, for example, even if the system-down occurs due to a turn-off of the power source during the process or the like, either the sequence block 114A or 114B remains normally and the state of the disk 110 can be easily recovered later.

FIGS. 7A to 7C show an updating procedure of the sequence blocks 114A and 114B according to the embodiment. FIGS. 7A and 7B show a transition of the state of the field "Revision" in the sequence blocks 114A and 114B, respectively. In FIGS. 7A to 7C, it is assumed that the time advances from the upper side to the lower side of the diagram. It is assumed that a file process such as updating or copy of the file which is recorded on the disk 110, new recording of the file, or the like is started at time A and the process is finished at time B. FIG. 7C shows the value of the field "Revision" at each time. It is assumed that both of the values of the field "Revision" of the sequence blocks 114A and 114B are initially equal to Revision=n-1.

When the file process for the files on the disk 110 is started at time A, the sequence block 114B is once deleted. At this time, the value of only the field "Revision" of the sequence block 114B is changed to Revision=Invalid Num and remains, or simultaneously with the start of the file process at time A, the existing sequence block 114B is overwritten by the sequence block 114B comprising only the field "Revision" (and a field "SPE Num" and the field "Block Size") whose value is Revision=Invalid.

On the other hand, the sequence block 114A is not changed even if the file process on the disk 110 is started at time A and the value of the field "Revision" is held to Revision=n-1.

When the file process is finished at time B, a result of the file process is reflected and the sequence block 114B in which the value of the field "Revision" is set to Revision=n is written. That is, the value of the field "Revision" is increased to a value which is larger than the value before the file process by "1". The MAC values and the D-ICVs regarding all of the files and directories on the disk 110 are calculated again and the sequence page is reconstructed and stored into the sequence block 114B.

When the writing of the sequence block 114B is finished, the writing of the sequence block 114A is started. First, the value of the field "Revision" of the sequence block 114A is set to Revision=Invalid Num and the sequence block 114A is invalidated (time C). The result of the file process is reflected and the sequence block 114A in which the value of the field "Revision" is set to Revision=n is written. After that, the sequence blocks 114A and 114B comprise the same data and have the same Revision=n in the field "Revision".

By updating the sequence blocks 114A and 114B as mentioned above, either the sequence block 114A or 114B is certainly valid at any time shown in FIGS. 7A to 7C. Therefore, even if a system-down occurs due to some reason during the file process such as recording, copy, or the like of the data, its rescue countermeasure can be performed.

That is, when the system is recovered, the MAC values, ICVs, and D-ICVs are formed from the files and directories on the disk 110 in the present situation. Those formed values are compared with contents of the sequence value which is valid just after the system recovery in the sequence blocks 114A and 114B. By obtaining a difference between them, some rescue countermeasure can be taken.

Figure 8:
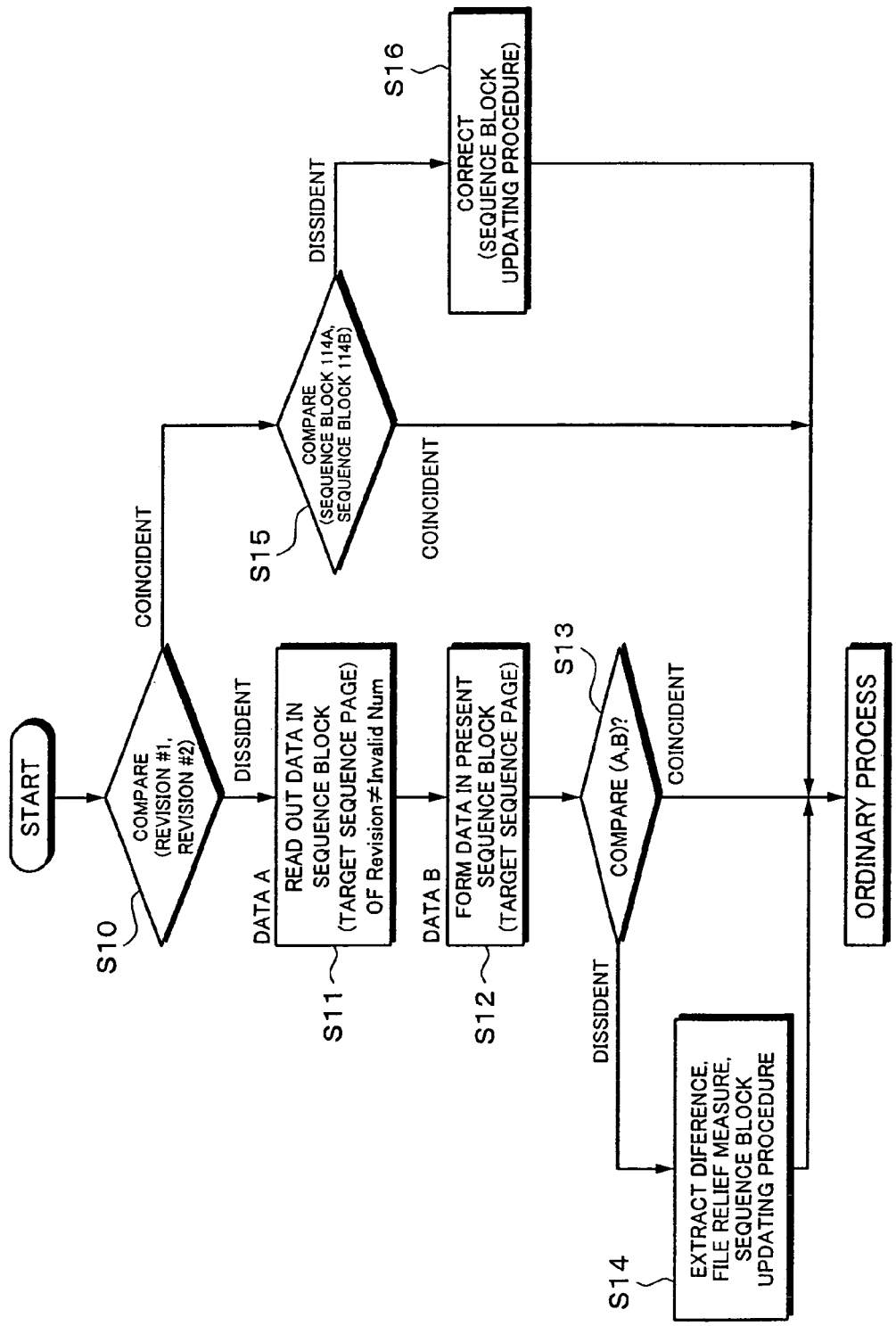
FIG. 8 is a flowchart showing processes of an example of an updating procedure of the sequence block including a rescue countermeasure.

FIG. 8 is a flowchart showing processes of an example of the updating procedure of the sequence block including the rescue countermeasure. Processes according to this flowchart are executed in the case where the data recorded in the sequence blocks 114A and 114B is updated.

First, in step S10, the values (referred to as Revision#1 and Revision #2) of the fields "Revision" of the sequence blocks 114A and 114B are compared. As a result of the comparison, if Revision#1 and Revision#2 do not coincide, the processing routine advances to step S11.

In step S11, the data of the sequence block in which the value of the field "Revision" is equal to Revision≠Invalid Num between the sequence blocks 114A and 114B is read out. The data as a target to be read out is the data of each of the sequence pages stored in this sequence block. This data is assumed to be data A.

In next step S12, the MAC arithmetic operation is executed on the basis of the data on the disk 110 in the present situation and data of the sequence block is newly formed. At this time, in a manner similar to step S11 mentioned above, the data as a target to be formed is the sequence page based on the file or directory on the disk 110. This data is assumed to be data B.

In step S13, the data A and data B are compared. As a result of the comparison, if it is determined that the data A and data B coincide, it is regarded that there is no problem, a series of processes according to the flowchart is finished, and the processing routine advances to the ordinary process. If it is decided in step S13 that the data A and data B do not coincide, the processing routine advances to step S14.

In step S14, a difference between the data A and data B is extracted and a rescue countermeasure of the files on the disk 110 is taken on the basis of the difference. For example, by obtaining the difference between the data A and data B, although the file or directory ought to exist according to the sequence block on the disk 110, it does not actually exist can be found. Similarly, by comparing the data A and data B, the file or the like which has the MAC value different from the MAC value recorded in the sequence block because the copyright information or the like of a predetermined file has been rewritten can be found.

A rescue countermeasure is taken to such a file if possible. For example, the file can be forcedly constructed by adding an EOF (End Of File) to a predetermined position in the data. With respect to the file having a fear that an illegal copy, an illegal rewriting of the copyright information, or the like has been performed, it is also possible to insert attributes indicating that the reproduction is impossible to such a file or delete the file.

After the difference between the data A and data B was extracted and the file rescue countermeasure was taken, an updating procedure of the sequence blocks 114A and 114B is executed as mentioned above with reference to FIGS. 7A to 7C.

In step S10 the values Revision#1 and Revision#2 of the fields "Revision" of the sequence blocks 114A and 114B are compared. If it is determined that they coincide, the processing routine advances to step S15. In step S15, with respect to the sequence blocks 114A and 114B, whether the data of the other fields coincide or not is further discriminated. If it is decided that they coincide, it is regarded that there is no problem. A series of processes according to this flowchart is finished and the processing routine advances to the ordinary process.

In step S15, if it is determined that the data of the other fields does not coincide, the processing routine advances to step S16 and an error correcting process of the sequence block 114A or 114B is executed. When the error correcting process of the sequence block is executed, a series of processes according to this flowchart is finished and the processing routine advances to the ordinary process.

The error correcting process in step S16 can be executed, for example, as follows. The information of the files or directories existing on the disk 110 is obtained, the MAC value of each file, the D-ICV of each directory, and further, the ICV of the whole disk 110 are formed on the basis of the obtained information. The sequence block in the present situation on the disk 110 is formed. The formed sequence block is compared with the sequence blocks 114A and 114B read out from the disk 110, respectively. The sequence block which coincides with the newly formed sequence block between the sequence blocks 114A and 114B is used as a reference and the updating procedure of the sequence block mentioned above in FIGS. 7A to 7C is executed.

A first application example of the data alteration checking method according to the invention will now be described. The first application example is an example which is suitable when it is used in the case where the files of the same kind are collectively stored every directory on the disk 110. More specifically speaking, a plurality of directories A, B, C, . . . which are formed to one disk 110 are constructed by different kinds of files every directory A, B, C, . . . . For example, the directory A is constructed by a still image file, the directory B is constructed by a motion image file, and the directory C is constructed by an audio file, respectively. As mentioned above, in case of considering a multi-purpose medium as a recording medium, many kinds of data exist on the same recording medium.

With respect to the alteration check, generally, it is presumed that it is relatively frequently performed when the recording medium is set into an application, the power source of the apparatus is turned on in a state where the disk 110 is loaded into the disk drive, or the like. Similarly, in the case where data is newly recorded to the recording medium or a copy or movement of a file to another recording medium occurs, the re-calculation of the ICV and the updating of the sequence blocks 114A and 114B are executed on the recording medium.

The application used here denotes a construction which can perform the recording, reproduction, or the like to the recording medium, such as application software installed in a computer apparatus, dedicated apparatus in which hardware and software are integratedly constructed, or the like.

On the other hand, all of the data existing on the recording medium cannot be always handled in dependence on the application. For example, in case of a music reproduction-only apparatus, if only the directory constructed by music files are used as targets, the medium is closed in this directory, and the alteration checking procedure is enabled to be executed, a time-dependent efficiency can be improved. Particularly, if the recording medium has a disk-shape like a disk 110 mentioned above, a time that is required to access to a predetermined address is relatively long in terms of its structure. As a recording capacity further increases, such a time-dependent efficiency cannot be ignored.

According to the first embodiment, the sequence page comprises: the MAC value of each file constructing one directory; and the ICVs formed by inputting all of the MAC values of this directory. The sequence pages corresponding to all of the directories on the recording medium are added with the fields in the sequence block and stored. Therefore, the closed alteration check can be performed in each sequence page. Thus, in case of collectively storing the same kinds of files every directory as mentioned above, by applying the alteration checking method according to the invention, the alteration check can be efficiently performed with respect to the time.

A second application example of the alteration checking method according to the first embodiment will now be described. The second application example is an example which is suitable when it is used in the case where a directory of the data whose copyright is protected and a directory of the data such as data which has personally been photographed or recorded or data which has been distributed in a free copyright state and whose copyright is not protected are separately recorded.

In case of the data whose copyright is not protected as mentioned above, the copy, movement, updating, or the like can be inherently performed without passing through a security system such as an alteration check or the like. However, if such data whose copyright is not protected is used as a target of the alteration check as mentioned above, the data cannot be reproduced or deleted according to circumstances, so that the usability is deteriorated.

On the other hand, there is also a method whereby whether the file is used as a target of the alteration check or not is specified on a file unit basis. However, even by this method, if the alteration checking procedure is closed for the whole recording medium, all of the files existing on the recording medium have to be scanned eventually and whether the alteration check should be executed or not has to be discriminated with respect to each file. A time-dependent loss occurs in a manner similar to the case mentioned in the above first application example.

According to the invention, as mentioned above, whether the file is used as a target of the data alteration check or not can be discriminated on a directory unit basis. Therefore, by storing the data which needs the copyright protection and the data which does not need the copyright protection into the different directories, the time-dependent loss can be reduced and the data alteration check can be performed.

The second embodiment of the invention will now be described. According to the second embodiment, the MAC values are formed by using the information which is physically peculiar and unique and which the disk-shaped recording medium has. Thus, the files can be bound to this disk-shaped recording medium and the illegal copy or the like of the file to another recording medium can be prevented.

FIG. 9 is a functional block diagram of an example showing fundamental processes for performing the data alteration check according to the second embodiment. In a manner similar to the foregoing first embodiment, a disk 230 has: a user data area 230A in which user data is recorded; and a lead-in area 230B which does not have a logic address by the file system. Further, in the second embodiment, an ID peculiar to the media has been recorded into a predetermined area on the disk 230 by a method whereby the media peculiar ID is peculiar to the disk 230 and its alteration is impossible or very difficult.

It is desirable to record the media peculiar ID into an area such as a lead-in area 230B which cannot be easily accessed by the user. Further, it is preferable to record the media peculiar ID by, for example, a recording method of a destruction system such that a recording film itself of the disk 230 is destroyed by a laser beam of a large power or the recording surface of the disk 230 is physically scratched in a manner such that the alteration by the user is impossible or difficult. The invention, however, is not limited to such a method. For example, it is also possible to stamp a peculiar ID onto the surface or the recording surface of the disk 230 by using a stamper or the like upon shipping of the disk 230 and use it as a media peculiar ID.

The MAC value is calculated on the basis of the MAC arithmetic operating method with respect to each of the files recorded in the user data area 230A on the disk 230. At this time, the foregoing media peculiar ID is also read out and used as an input at the time of the MAC arithmetic operation. Referring again to FIG. 9, the attribute information of the file such as copyright information and important information of the file and the information serving as a key that is peculiar to the file, for example, the contents key used at the time when the actual data portion of the file is encrypted are read out from the file #1 recorded on the disk 230 and supplied to an MAC arithmetic operating unit 231.

The MAC arithmetic operating unit 231 forms the MAC value #1 by using the important information of the file and the contents key which were obtained from each file and the media peculiar ID recorded on the disk 230. The formed MAC value #1 is stored into the file #1 as header information of the file #1 and stored into a sequence block 232. The sequence block 232 is recorded into the lead-in area 230B. The sequence block 232 corresponds to the sequence block 114 and indicates an area in which the information regarding the alteration check is stored and its data structure.

FIGS. 10A and 10B are functional block diagrams of an example showing a data alteration checking method according to the second embodiment. First, as shown in FIG. 10A, by a method similar to that shown in FIG. 9, the MAC value #1 is formed from the information on the file #1 and the media peculiar ID and the formed MAC value #1 is stored into the file #1 as header information to the file #1. The MAC value #1 is stored into the sequence block 232 together with the MAC values of the other files on the disk 230. A case where the file #1 is copied or moved into a disk 230' different from the disk 230 without using a legal procedure is now considered.

In a manner similar to that mentioned above, the media peculiar ID has been recorded in, for example, the lead-in area 230B on the disk 230'. The media peculiar IDs recorded on the disk 230 and 230' are assumed to be a media peculiar ID-1 and a media peculiar ID-2, respectively. The media peculiar ID is peculiar to the recording media. The media peculiar ID-1 of the disk 230 and the media peculiar ID-2 of the disk 230' are set to different values.

When the file is copied or moved, as shown in FIG. 10B, the data alteration check is performed on the disk 230' on the movement destination side. First, the important information of the file and the contents key are extracted from the header information of the file #1 on the disk 230' and supplied to the MAC arithmetic operating unit 231. At the same time, the media peculiar ID-2 of the disk 230' is read out and supplied to the MAC arithmetic operating unit 231. In the MAC arithmetic operating unit 231, the MAC arithmetic operation is executed by using the important information of the file, the contents key, and the media peculiar ID-2 which were supplied, thereby forming the MAC value #1". The formed MAC value #1" is supplied to a comparing unit 233.

On the other hand, the MAC value #1 formed on the basis of the media peculiar ID-1 on the disk 230 on the copying source side has been stored in the header information of the file #1. The MAC value #1 is read out from the header of the file #1 and supplied to the comparing unit 233.

In the comparing-unit, the supplied MAC value #1 and MAC value E1" are compared. The media peculiar ID-1 of the disk 230 and the media peculiar ID-2 of the disk 230' are different as mentioned above. Therefore, even if the file #1 on the disk 230 on the copying source side and the file #1 on the disk 230' on the copy destination side have substantially the same contents, the MAC value #1 formed by using the media peculiar ID-1 and the MAC value #1' formed by using the media peculiar ID-2 are different, so that the dissidence of the MAC values is caused.

Further, since the copy of the file #1 onto the disk 230' has been performed without using the legal procedure, the MAC value corresponding to the copied file #1 is not stored in a sequence block 232' on the disk 230'. Therefore, as shown in FIG. 2 mentioned above, when the MAC value stored in the sequence block 232' is compared with the MAC values of all of the files on the disk 230', illegality is detected.

According to the second embodiment as mentioned above, although the file can be copied or moved between the different disks, the file which was illegally copied or moved can be detected on the copy or movement destination side. Therefore, the reproduction of the relevant file from the disk on the copy or movement destination side can be inhibited or the deletion or the like of the relevant file from the disk on the copy or movement destination side can be performed. Thus, a certain file can be substantially bound onto a certain disk.

According to the second embodiment, it will be understood that the ICV is not always necessary for the data alteration check. Although the ICV is used for keeping a matching property of the files existing on the same recording medium, since the MAC arithmetic operation is executed to all of the files existing on the recording medium as targets, the time-dependent efficiency is low. By using the second embodiment, however, since the recording medium and the files substantially correspond to each other in a one-to-one relational manner, even if there is no ICV, the matching property in the whole recording medium can be held.

Particularly, when the recording medium has a disk-like shape, a time that is required to access to a predetermined address is relatively long in terms of its structure. As the recording capacity increases, the time-dependent efficiency can not be ignored. This problem can be reduced by using the second embodiment.

A modification of the second embodiment will now be described. In the foregoing second embodiment, the media peculiar ID as an ID which is peculiar to the recording medium and whose alteration is impossible or difficult is used as an input at the time of the MAC arithmetic operation. On the other hand, according to the modification, defect information which was recorded on the recording medium and indicates a defect of the recording medium is used as an input at the time of the MAC arithmetic operation. Since the defect information has a different value every recording medium at an enough large probability, it can become the information peculiar to the recording medium. Therefore, the alteration check similar to that in the foregoing second embodiment can be performed by using the defect information.

Physical defects of the recording area certainly occur on the disk-shaped recording medium upon manufacturing. The physical defects of the recording area which occurred upon manufacturing are called defects. The defects occur in a random-number manner in the manufacturing step of the disk-shaped recording medium. A probability such that another disk-shaped recording medium having substantially the same defect state as that of a certain disk-shaped recording medium exists in a manufacturing lot is sufficiently small. Therefore, the defect information can be regarded as physical information that is peculiar in the disk-shaped recording medium.

As a prerequisite of the above modification, upon shipping of the disk-shaped recording medium, the defect state is verified and defect information called PDL (Primary Defect List) to which the defect state of each minimum recording unit has been reflected is recorded onto each disk. FIG. 11 shows a data structure of an example of the PDL. The PDL consists of a bit train and first 16 bits are set to a fixed value showing that the data is the PDL. Each of the subsequent bits indicates each of the minimum recording units of the disk-shaped recording medium in accordance with, for example, the address ascending order and is set to the high level. That is, it is shown that the defect exists in the minimum recording unit corresponding to the bit whose value is equal to "1" and this minimum recording unit cannot be used. Such a bit train is recorded over the whole number of minimum recording units of the disk-shaped recording medium. Assuming that the whole recording capacity of the disk-shaped recording medium is equal to, for example, 2 GBytes, the PDL has a capacity of 2 to 16 kbytes.

It is necessary to record the PDL into an area which cannot be easily accessed by the user such as a lead-in area on the disk-shaped recording medium lest the PDL itself is altered.

In the modification of the second embodiment, the PDL is used in the MAC arithmetic operation. Thus, the files recorded on the disk-shaped recording medium are the closed files on this disk-shaped recording medium.

FIG. 12 is a functional block diagram showing an example of fundamental processes for performing the data alteration check according to the modification of the second embodiment. In a manner similar to the first and second embodiments mentioned above, a disk 240 has: a user data area 240A in which user data is recorded; and a lead-in area 240B which does not have a logic address by the file system. The PDL is recorded in the lead-in area 240B.

An MAC value is calculated on the basis of the MAC arithmetic operating method with respect to each of the files recorded in the user data area 240A of the disk 240. At this time, the foregoing PDL is also read out and used as an input at the time of the MAC arithmetic operation. Referring to FIG. 12, important information such as copyright information and the information serving as a key that is peculiar to this file, for example, a contents key used when an actual data portion of the file is encrypted are read and supplied to an MAC arithmetic operating unit 241. On the other hand, the PDL recorded in, for example, the lead-in area 240 is read and supplied to the MAC arithmetic operating unit 241.

In the MAC arithmetic operating unit 241, the MAC value #1 is formed by using the important information and the contents key which were obtained from each file and the PDL recorded on the disk 240. The formed MAC value #1 is stored into the file #1 as header information of the file #1 and stored into a sequence block 242. The sequence block 242 is recorded into the lead-in area 240B.

FIGS. 13A and 13B are functional block diagrams showing an example of a data alteration checking method according to the modification of the second embodiment. First, as shown in FIG. 13A, by a method similar to that shown in FIG. 12 mentioned above, the MAC value #1 is formed from the information on the file #1 and the PDL and the formed the MAC value #1 is stored into the file #1 as header information of the file #1. The MAC value #1 is also stored into a sequence block 242 together with the MAC values of the other files on the disk 240. A case where the file #1 has been copied or moved onto a disk 240' different from the disk 240 without performing a legal procedure is now considered.

The PDL has been recorded, for example, into the lead-in area 240B on the disk 240' in a manner similar to that mentioned above. The PDLs recorded on the disks 240 and 240' are called PDL-1 and PDL-2, respectively. A probability that these PDL-1 and PDL-2 have the same value is extremely small as mentioned above.

When the file is copied or moved, as shown in FIG. 13B, the data alteration check is performed on the disk 240' on the movement destination side. First, the important information of the file and the contents key are extracted from the header information of the file #1 on the disk 240' and supplied to the MAC arithmetic operating unit 241. At the same time, the PDL-2 of the disk 240' is read out and supplied to the MAC arithmetic operating unit 241. In the MAC arithmetic operating unit 241, the MAC arithmetic operation is executed by using the important information of the file, the contents key, and the PDL-2, thereby forming an MAC value #1". The formed MAC value #1" is supplied to a comparing unit 243.

The MAC value #1 formed on the basis of the PDL-1 in the disk 240 on the copying source side has been stored in the header information of the file #1. The MAC value #1 is read out from the header of the file #1 and supplied to the comparing unit 243.

The comparing unit compares the supplied MAC value #1 and MAC value #1". As mentioned above, since a probability that the PDL-1 of the disk 240 and the PDL-2 of the disk 240' coincide is extremely small, even if the file #1 on the disk 240 on the copying source side and the file #1 on the disk 240' on the copy destination side have substantially the same contents, the MAC value #1 formed by using the PDL-1 and the MAC value #1" formed by using the PDL-2 are different at an extremely high probability, so that the dissidence of the MAC values occurs.

Further, since the file #1 was copied to the disk 240' without performing the legal procedure, the MAC value corresponding to the copied file #1 is not stored in a sequence block 242' on the disk 240'. Therefore, when the MAC value stored in the sequence block 242' is compared with the MAC values of all of the files existing on the disk 240', the illegality is detected.

As mentioned above, even in the modification of the second embodiment, in a manner similar to the second embodiment, although the file can be copied or moved between the different disks, the file which was illegally copied or moved can be detected on the copy or movement destination side. Therefore, for example, the reproduction of the relevant file from the disk on the copy or movement destination side can be inhibited or the deletion or the like of the relevant file from the disk on the copy or movement destination side can be performed. Thus, a certain file can be substantially bound onto a certain disk.

According to the modification of the second embodiment, in a manner similar to the second embodiment, the ICV is not always necessary for the data alteration check. Although the ICV is used for keeping a matching property of the files existing on the same recording medium, since the MAC arithmetic operation is executed to all of the files existing on the same recording medium as targets, the time-dependent efficiency is low. By using this modification, however, since the recording medium substantially corresponds to the files in a one-to-one relational manner, even if there is no ICV, the matching property in the whole recording medium can be held.

Particularly, when the recording medium has a disk shape, a time that is required to access to a predetermined address is relatively long in terms of its structure. As the recording capacity further increases, the time-dependent efficiency can not be ignored. This problem can be reduced by using the modification of the second embodiment.

The foregoing first and second embodiments and the modification of the second embodiment can be combined and embodied.

Figure 14:
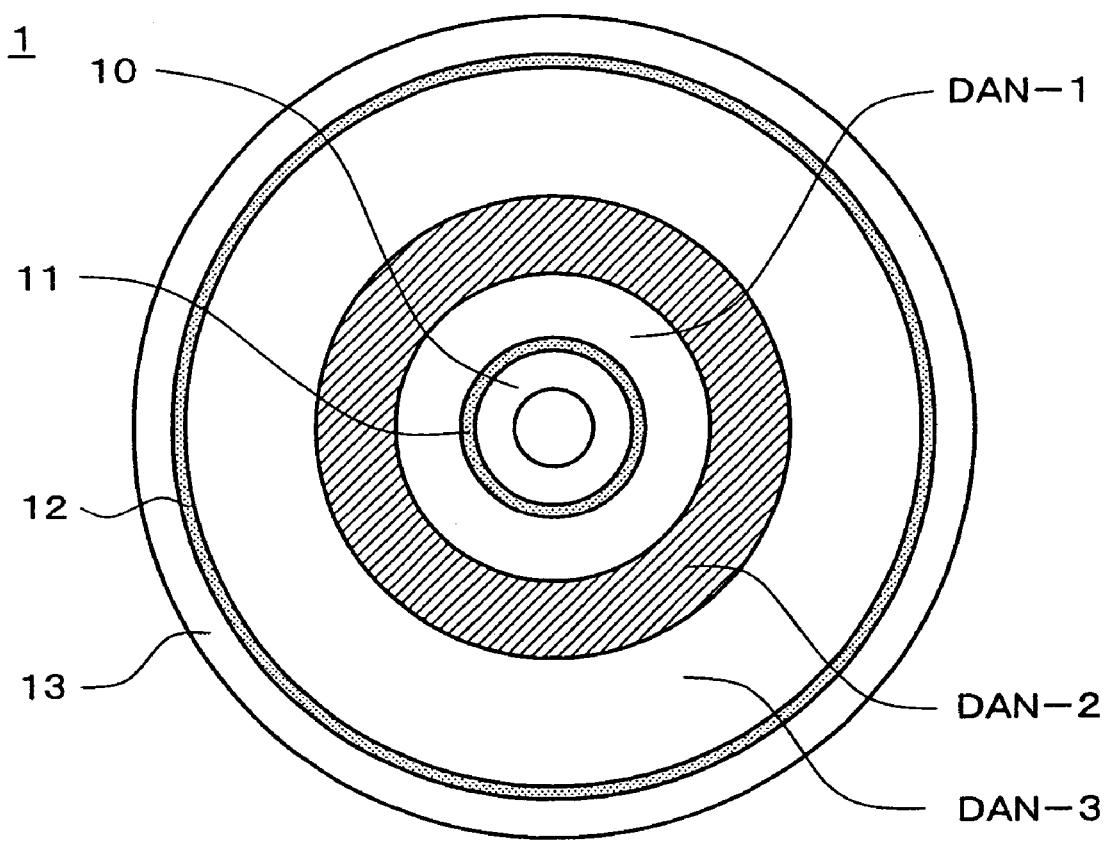
FIG. 14 is a schematic diagram showing a logic format of a disk-shaped recording medium which can be applied to the invention in correspondence to a shape of the disk.

FIG. 14 shows a logic format of a disk-shaped recording medium 1 which can be applied to the invention in correspondence to the shape of the disk. The logic format of the disk-shaped recording medium 1 conforms with the UDF (Universal Disk Format) mentioned in the prior art. On the disk-shaped recording medium 1 (hereinafter, simply referred to as a disk 1), a lead-in area 10 is arranged at the innermost rim portion. A logical sector number (LSN) is allocated from the outside of the lead-in area 10. Subsequently, a volume information are all, areas DAN-1 (Data Area Number-1), DAN-2, and DAN-3, and a volume information area 12 are arranged in order. A lead-out area 13 is arranged in the outermost rim portion. Logical block numbers are allocated to the areas DAN-1 to DAN-3.

FIG. 15 shows contents of an example of the volume information areas 11 and 12. A VRS (Volume Recognition Sequence), an MVDS (Main Volume Descriptor), and an LVIS (Logical Volume Integrity Sequence) are written in the volume information area 11 on the basis of the regulation of the UDF. An anchor point is put to the end of the volume information area 11. The contents of the volume information area 11 are written twice as an RVDS (Reserve Volume Descriptor Sequence) into the volume information area 12 inside of the lead-out area 13. Anchor points are put to the head and end of the volume information area 12. The anchor point at the end of the volume information area 12 corresponds to the last logical sector number.

A portion in a range from the logical sector number to (the last logical sector number—272) is set to an LVS (Logical Volume Space) in which a partition area is provided. The areas DAN-1 to DAN-3 are arranged in the LVS. The area DAN-1 provided on the innermost rim side of the LVS comprises an FSD (File Set Descriptor) and an SBD (Space Bitmap Descriptor) based on the regulation of the UDF. The SBD expresses empty area information of the whole disk 1 by setting the flag to "1" every sector. An address of the FE of the root directory of the layer structure of the file system is shown in the area DAN-1.

The area DAN-2 is an area in which the FE (File Entry) of the directory and the FID (File ID) of its substance are arranged. That is, the FE of the directory and the FID of the substance are collectively recorded in the area DAN-2. In the area DAN-2, a predetermined capacity is previously and continuously held at the time of formatting, which will be explained hereinlater. Although the details will be explained hereinlater, an unused area of the area DAN-2 is assured as a file to which a specific attribute has been added. The file comprising the unused area of the area DAN-2 is referred to as an EIF (Entry Information File) hereinafter. By handling the unused area as a file of EIF, it is possible to prevent the unused area from being recognized as an empty area in the SBD.

Although already mentioned in the prior art, the FE indicates a location (address) and a size of the substance of the file or directory. Those information is written by the AD (Allocation Descriptor) in the FE. The FID indicates a name of the file or directory and a location (address) and a size of the FE. Those information is written by an ICB (Information Control Block) in the FID.

The area DAN-3 is an area in which the FE of the file and its substance are put. In the area DAN-3, the FE of the file and the file corresponding to the FE are continuously arranged with respect to the addresses. When files are added, the FEs of the files to be added are arranged to the existing files continuously with respect to the addresses. Further, the substances of the files are arranged continuously with respect to the addresses. By arranging the FEs of the files and the substances continuously with respect to the addresses as mentioned above, the files can be accessed at a high speed.

Figure 16:
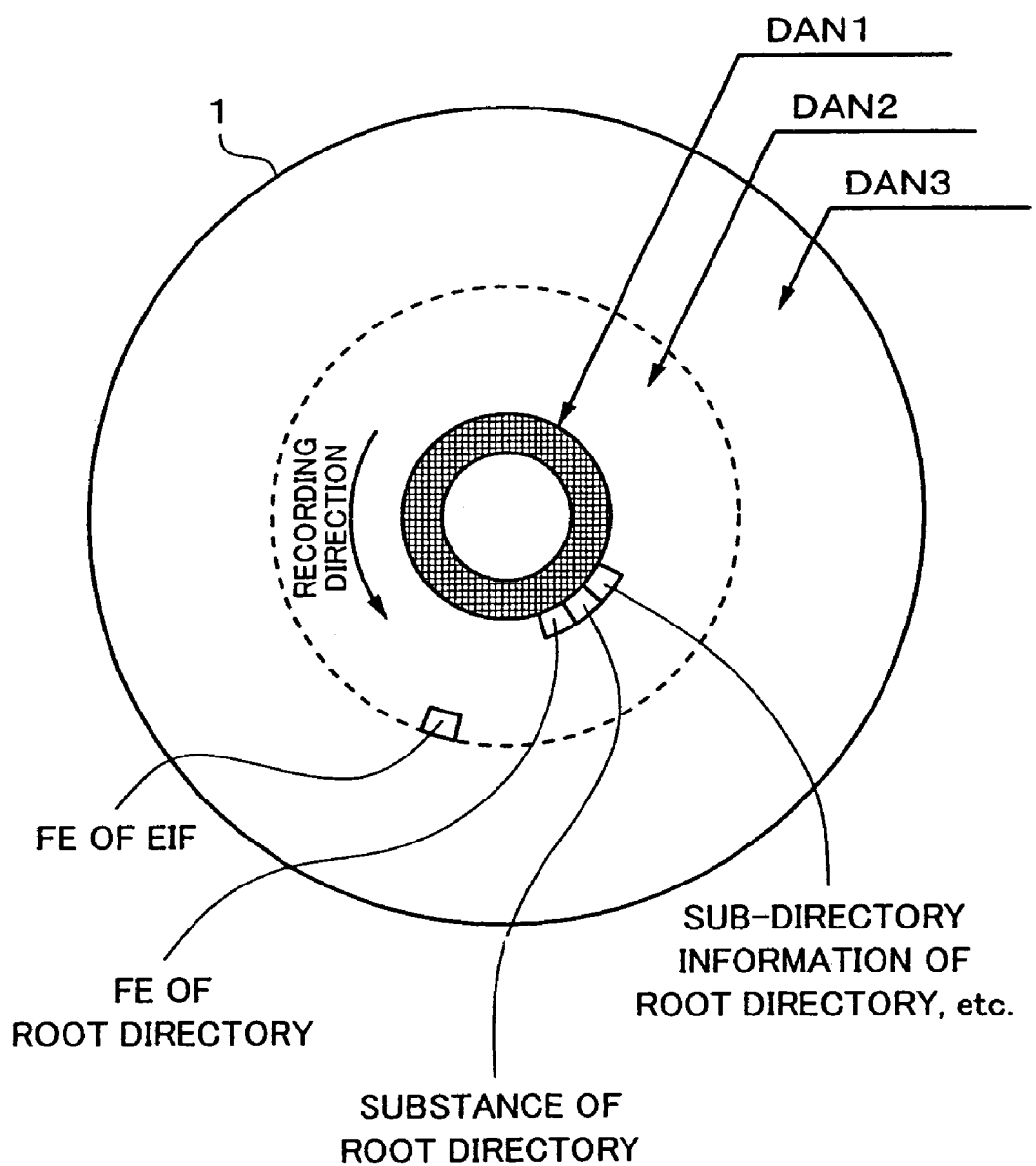
FIG. 16 is a schematic diagram for explaining an administrating method of directories, files, and empty areas on the disk-shaped recording medium.
Figure 17:
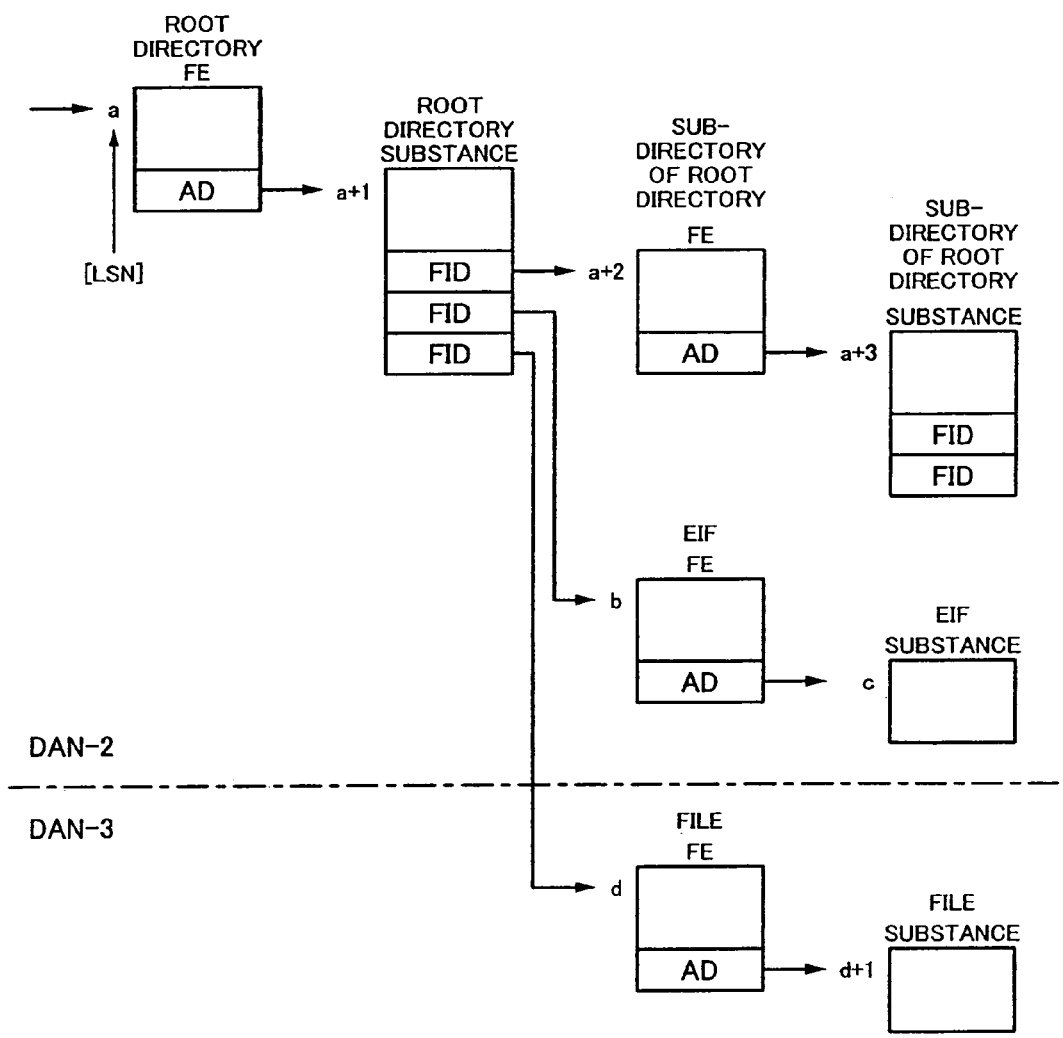
FIG. 17 is a schematic diagram for explaining an administrating method of directories, files, and empty areas on the disk-shaped recording medium.

An administrating method of the directories, files, and empty areas in the disk-shaped recording medium 1 will now be described with reference to FIGS. 16 and 17. FIG. 16 is a diagram showing the areas DAN-1 to DAN-3 extracted from FIG. 14 mentioned above. It is assumed that the recording direction of the data is set to be counterclockwise as shown in an example in FIG. 16. FIG. 17 shows a layer structure of an example of each FE, FID, and substance.

For example, it is assumed that the FE of the root directory is started from LSN=a. The address and size of the substance of the root directory are shown by the AD in the FE of the root directory. The address of the root directory can be continuously arranged together with the FE of the root directory and, for example, LSN=a+1. The substance of the root directory includes one or more FIDs. The name, address, and size of the FE of the sub-directory of the root directory (hereinafter, such a sub-directory is abbreviated to a sub-directory) are written in the FID. The FE of the sub-directory is arranged so as to be continuous to the substance of the root directory and, for example, LSN=a+2. The address and size of the substance of the sub-directory are written by the AD in the FE of the sub-directory. The address of the substance of the sub-directory is arranged so as to be continuous to the FE of the sub-directory and, for example, LSN=a+3. One or more FIDs are included in the substance of the sub-directory and the names, addresses, and sizes of the files and other sub-directories are written.

By referring to each FE, FID, and substance as mentioned above, as shown in an example in FIG. 17, the substance of the root directory, the sub-directory information of the root directory, and the like are arranged continuously for the FE of the root directory arranged at a predetermined position of the innermost rim portion of the area DAN-2.

Referring to FIG. 17, the name, address, and size of the FE of the EIF are written by the FID in the substance of the root directory. The address and size of the substance of the EIF are written by the AD in the FE of the EIF. Since the EIF is handled as a file as mentioned above, its address and size are shown by the FE in a manner similar to the other files.

The FE of the EIF is arranged, for example, behind the substance of the EIF as shown in an example in FIG. 16. A start address and/or an end address and the size of the substance of the EIF are fluctuated in dependence on an amount of each information which is written into the area DAN-2.

The FE of the root directory, the substance of the root directory, the FE of the sub-directory of the root directory, the substance of the sub-directory of the root directory, the FE of the EIF, and the substance of the EIF are arranged in the area DAN-2 as mentioned above.

The FE of the file and the substance of the file are arranged in the area DAN-3. The substance of the file is an area in which user data or the like is actually written. As shown in an example in FIG. 17, the FE of the file in which the name, address, and size have been written by the FID in the substance of the root directory is arranged in the area DAN-3. The start address of the FE of the file at this time is assumed to be LSN=d. The address and size of the substance of the relevant file are shown by the AD in the FE of the file. The substance of the file is arranged so as to be continuous to the FE of the relevant file and, for example, the start address is set to LSN=d+1.

As mentioned above, the area DAN-2 is previously held at the time of the formatting process of the disk 1. Subsequently, a formatting method of an example of the disk 1 will be schematically explained. It is assumed that the lead-in area 10 and lead-out area 13 have already existed before the formatting process, for example, by being preliminarily formed at the time of a pressing step in the manufacturing of the disk 1. The formatting process is progressed from the inner rim side toward the outer rim side of the disk 1.

When the formatting process is started, the foregoing VRS, MVDS, and LVIS are first written from the outside of the lead-in area 10. Subsequently, the LVS is formed. In the LVS, the area DAN-1 is first formed. The FSD is written and the position of the root directory is determined. The SBD is formed. At this time, by setting the area of the EIF mentioned above to the used area in the SBD, the area of the EIF is assured.

When the SBD is formed and the area DAN-1 is formed, the area DAN-2 is subsequently formed from the outside of the area DAN-1. Upon formation of the area DAN-2, the FE of the root directory and the substance of the root directory are first continuously written into predetermined addresses on the basis of the FSD written in the area DAN-1. Subsequently, the FID of the EIF is added to the substance of the formed root directory. In the FID, the address of the FE of the EIF is designated.

At this time, the attributes of the EIF are designated in the FID. The attributes of the EIF which are designated are used for preventing the EIF from being subjected to the erasure, rewriting, movement, or the like by another apparatus or OS (Operating System). For example, a "hidden file attribute", a "system file attribute", and a "read-only file attribute" are designated together as attributes of the EIF.

The "hidden file attribute" is an attribute for disabling the file to which this attribute has been set to be browsed by an-ordinary method. The "system file attribute" is an attribute for showing that the file to which this attribute has been set is a file that is necessary for the system. The "read-only file attribute" is an attribute for showing that the file to which this attribute has been set is a read-only file and its change and erasure are inhibited by the system. By designating all of those three attributes into the file, the process for erasure, rewriting, movement, or the like to the file cannot be executed except for the purpose operation. Those attributes can be deleted by a predetermined method.

Subsequently, the FE of the EIF is formed. As mentioned above, in the FE, the address and size of the relevant file are designated. Therefore, merely by designating the FE, the relevant file exists and it can be used as a dummy file. The "read-only file attribute" and "system file attribute" are designated in the FE of the EIF.

By allowing the EIF to exist in the area DAN-2 as mentioned above, the empty area in the area DAN-2 can be held by the EIF. As mentioned above, after completion of the formatting process, the FE and substance of the sub-directory are written into the DAN-2. At this time, the area of the EIF is deleted and the FE and substance of the sub-directory are formed in the area DAN-2.

Although the details will be explained later, the forming order of the area DAN-2 is not limited to the foregoing order but this area can be also formed in another order. At this time, an arranging order of each information in the area DAN-2 also changes naturally.

The area DAN-2 is formed as mentioned above. Although the outside of the area DAN-2 is the area DAN-3, no process is executed in particular in the area DAN-3. For example, the following process is executed by jumping the area designated as an area DAN-3. The RVDS is formed in the area next to the area DAN-3. As mentioned above, the information of the VRS, MVDS, and LVIS which have already been formed is written twice. The RVDS is formed and the formatting process of the disk 1 is completed.

Figure 18:
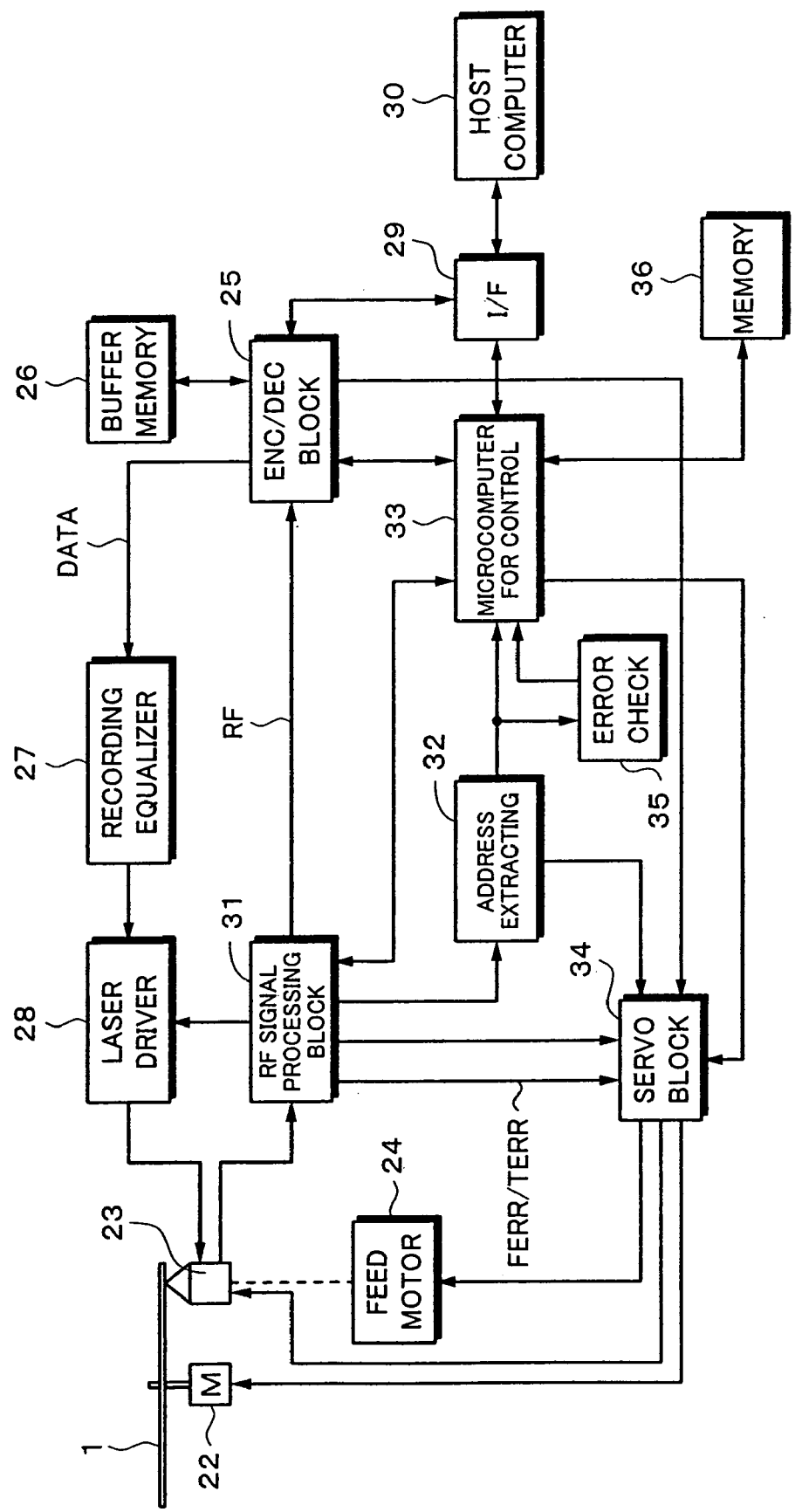
FIG. 18 is a block diagram showing a construction of an example of a driving apparatus which can be applied to the invention.

FIG. 18 shows a construction of an example of a driving apparatus which can be applied to the invention. It is now assumed that a phase-change metal material is used as a recording layer of the disk 1 and the driving apparatus records data onto the disk 1 by a phase-change technique such that a temperature which is applied to the recording layer is controlled by adjusting a power of a laser beam, thereby changing the recording layer to a crystal or amorphous state.

The disk 1 is rotated by a spindle motor 22. To record data onto the disk 1 and reproduce the data from the disk 1, an optical pickup 23 is provided. The optical pickup 23 is fed in the disk radial direction by a feed motor 24.

Data from an external host computer 30 is supplied to a drive through an interface 29 (for example, SCMS (Serial Copy Management System)). An encoder/decoder block 25 is connected to the interface 29. A buffer memory 26 is connected to the encoder/decoder block 25. The buffer memory 26 holds write data or read data.

The write data is supplied to the encoder/decoder block 25 through the interface 29. The encoder/decoder block 25 forms data of the foregoing format upon recording and subsequently encodes the data in accordance with this format. Upon reproduction, the encoder/decoder block 25 performs a decoding process and outputs digital data to the host computer 30 through the interface 29. In the encoder/decoder block 25, for example, the address is added as a subcode and also added to the header in the data.

The recording data from the encoder/decoder block 25 is supplied to a laser driver 28 through a recording equalizer 27. The laser driver 28 forms a driving waveform having a predetermined level to record the recording data onto the disk 1. An output of the laser driver 28 is supplied to the optical pickup 23 and the data is recorded. A laser power of the laser driver 28 is controlled to a proper value by an APC (Automatic Power Control) in an RF signal processing block 31 as mentioned above. A signal generated by the return light from the disk 1 is supplied to the RF signal processing block 31. An address extracting circuit 32 extracts address information on the basis of the signal supplied from the RF signal processing block 31. The extracted address information is supplied to a microcomputer 33 for control, which will be explained hereinlater.

In the RF signal processing block 31, a matrix amplifier arithmetically operates a detection signal of a photodetector, thereby forming a tracking error signal TERR and a focusing error signal FERR. The tracking error signal and the focusing error signal are supplied to a servo block 34.

The control microcomputer 33 controls the seeking operation by using the address and executes a control or the like of the laser power by using a control signal. The control microcomputer 33 comprises a CPU (Central Processing Unit), an RAM (Random Access Memory), an ROM (Read Only Memory), and the like and controls the whole driving operation of the I/F 29, encoder/decoder block 25, RF signal processing block 31, servo block 34, and the like. A memory 36 is connected to the control microcomputer 33.

Further, the access to the lead-in area 10 on the disk 1 is controlled by the control microcomputer 33. The foregoing sequence block which is recorded into the lead-in area is read out by the control microcomputer 33. The read-out sequence block is stored into, for example, the memory 36. The header information of the file recorded in the user area (area DAN-3) on the disk I is read out by the control microcomputer 33 and stored into, for example, the memory 36. The media peculiar IDs and PDLs which were physically written on the disk 1 as shown in the second embodiment and its modification are also read out by the control microcomputer 33 and stored into the memory 36.

The MAC arithmetic operating unit and the comparing unit mentioned above are constructed, for example, in a software manner in the control microcomputer 33. The MAC arithmetic operating unit and the comparing unit can be also separately provided in a hardware manner. By the MAC arithmetic operating unit, the MAC values or the like as mentioned above are formed on the basis of those information stored in the memory 36 and the process such as a data alteration check or the like is executed.

The RF signal which is obtained by reproducing the disk 1 is supplied to the encoder/decoder block 25. The encoder/decoder block 25 executes a decoding process according to a predetermined format such as demodulation of a modulating process which was performed upon recording, decoding (that is, error correction) of an error correction code, and the like. In the encoder/decoder block 25, the reproduction data is stored into the buffer memory 26. When a read command from the host computer 30 is received, the read data is transferred to the host computer 30 through the I/F 29.

A frame sync signal, the tracking error signal, and the focusing error signal from the RF signal processing block 31 and the address information from the address extracting circuit are supplied to the servo block 34. The servo block 34 executes a tracking servo and a focusing servo for the optical pickup 23, a spindle servo for the spindle motor 22, and a thread servo for the feed motor 24.

Although the example in which the host computer 30 is connected to the driving apparatus has been described above, the invention is not limited to such an example. As an apparatus which is connected to the driving apparatus, another apparatus can be also connected so long as it inputs and outputs the digital signal and to which the interface is adapted. For example, the driving apparatus can be also built in a portable digital video recorder with a camera in which a photographed image is recorded onto the disk-shaped recording medium.

Although the example in which the format data to the disk 1 is formed by the encoder/decoder block 25 has been described above, the invention is not limited to such an example. The format data can be also formed by the control micro computer 33. The format data can be also supplied from the host computer 30.

As described above, according to the invention, since the MAC values of the respective files are collectively managed on a directory unit basis, there is an effect such that the procedure that is required for the data alteration check can be minimized in accordance with the specification of the application. Particularly, in case of using the disk-shaped recording medium as a recording medium, there is an effect such that the access performance at the time when the data alteration check of each file is performed can be remarkably improved.

According to the invention, since the data for performing the data alteration check, that is, the data to protect the copyright is bound on a directory unit basis, there is an effect such that the access performance for the data which does not need the protection of the copyright can be assured. There is, consequently, an effect such that the data alteration check administration space, that is, the size of sequence block can be also minimized.

Further, when the value corresponding to a certain specific file is searched from the list of the alteration check values (MAC values), since the number of MAC entries in the sequence page corresponding to the directory as a target becomes a parameter of the search, there is an effect such that a search efficiency can be improved as compared with that in case of using the MAC entries of the whole disk as parameters.

Moreover, since the size of sequence block as an alteration check administration space is set to the variable length, the size of sequence block can be set to the minimum value according to the number of files or directories. There is an effect such that the space efficiency and search efficiency can be improved.

As described above, according to the second embodiment of the invention and the modification of the second embodiment, the information that is peculiar to the recording medium, that is, the information which cannot be easily altered by the user is used together with the attribute information of the file or the like and the MAC arithmetic operation is executed. Therefore, there is an effect such that even if another new arithmetic operation or mechanism is not introduced, the files recorded on the recording medium can be substantially bound on this disk.

According to the second embodiment of the invention and the modification of the second embodiment, since the above effects can be realized separately from the encryption of the data recorded in the file, in the copy or movement of the file according to the legal procedure, there is no need to modify the data itself and it is sufficient to execute the minimum process. There is, consequently, an effect such that a situation causing a limitation of the usability can be avoided while preventing the data alteration.

Further, according to the second embodiment of the invention and the modification of the second embodiment, since the ICVs used hitherto in case of performing the alteration check with respect to the whole recording medium are not always necessary, there is an effect such that the processing time which is caused at the time of the alteration checking procedure can be reduced.

The present invention is not limited to the foregoing embodiments but many modifications and variations are possible within the spirit and scope of the appended claims of the invention.

What is claimed is:

1. Data reproducing apparatus for reproducing data recorded as files in at least one directory on a recording medium, comprising:

first arithmetic operating means for performing a first predetermined arithmetic operation on each file read from said recording medium, using inputted information serving as a key peculiar to that file, to form a first arithmetic operation value for that file;

second arithmetic operating means for performing a second predetermined arithmetic operation on each directory in which at least one of said files is bound, using the first arithmetic operation values of all of the files included in that directory, to form a second arithmetic operation value for that directory;

reading means for reading from said recording medium a file and a third arithmetic operation value corresponding to said second arithmetic operation value, said third arithmetic operation value being recorded in a predetermined area of said recording medium; and comparing means for comparing said third arithmetic operation value and said second arithmetic operation value to detect data alteration.

2. The apparatus of claim 1, wherein said comparing means determines that a file has been altered if said second and third arithmetic operation values do not coincide.

3. The apparatus of claim 1, wherein said files are bound in a directory dependent upon file type.

4. The apparatus of claim 1, wherein said third arithmetic operation value is recorded in an area on said recording medium not accessed by a file system.

5. Data recording apparatus for recording data files in at least one directory on a recording medium, comprising:

first arithmetic operating means for performing a first predetermined arithmetic operation on each file to be recorded on said recording medium, using inputted information serving as a key peculiar to that file, to form a first arithmetic operation value;

second arithmetic operating means for performing a second predetermined arithmetic operation on each directory in which at least one of said files is bound, using the first arithmetic operation values of all of the files included in that directory, to form a second arithmetic operation value for that directory; and recording means for recording said first and second arithmetic operation values on said recording medium.

6. The apparatus of claim 5, wherein said files are bound in a directory dependent upon file type.

7. The apparatus of claim 5, wherein said third arithmetic operation value is recorded in an area on said recording medium not accessed by a file system.

8. A data alteration checking method to discriminate whether or not data recorded as files in at least one directory on a recording medium has been altered, comprising the steps of:

performing a first predetermined arithmetic operation on each file read from said recording medium, using inputted information serving as a key peculiar to that file, to form a first arithmetic operation value for that file;

performing a second predetermined arithmetic operation on each directory in which at least one of said files is bound, using the first arithmetic operation values of all of the files included in that directory, to form a second arithmetic operation value for that directory;

comparing a third arithmetic operation value, recorded in a predetermined area of said recording medium and corresponding to said second arithmetic operation value, to said second arithmetic operation value to detect data alteration; and determining that said file has been altered if said second and third arithmetic operation values do not coincide.

9. Data alteration checking apparatus to discriminate whether or not data recorded as files in at least one directory on a recording medium has been altered, comprising:

first arithmetic operating means for performing a first predetermined arithmetic operation on each file read from said recording medium, using inputted information serving as a key peculiar to that file, to form a first arithmetic operation value for that file;

second arithmetic operating means for performing a second predetermined arithmetic operation on each directory in which at least one of said files is bound, using the first arithmetic operation values of all of the files included in that directory, to form a second arithmetic operation value for that directory;

comparing means for comparing a third arithmetic operation value, recorded in a predetermined area of said recording medium and corresponding to said second arithmetic operation value, to said second arithmetic operation value to detect data alteration; and means for determining that said file has been altered if said second and third arithmetic operation values do not coincide.

10. A data alteration checking system, comprising:

first arithmetic operating means for performing a first predetermined arithmetic operation on each file to be recorded on said recording medium, using inputted information serving as a key peculiar to that file, to form a first arithmetic operation value;

second arithmetic operating means for performing a second predetermined arithmetic operation on each directory in which at least one of said files is bound, using the first arithmetic operation values of all of the files included in that directory, to form a second arithmetic operation value for that directory;

recording means for recording said first and second arithmetic operation values on said recording medium;

reading means for reading said files and a third arithmetic operation value corresponding to said second arithmetic operation value from said recording medium; and comparing means for comparing said second and third arithmetic operation values, whereby file alteration is determined when said second and third arithmetic operation values do not coincide.

* * * * *